(12) United States Patent
Desai et al.

(10) Patent No.: US 12,353,479 B2
(45) Date of Patent: Jul. 8, 2025

(54) CLASSIFYING DOCUMENTS USING A DOMAIN-SPECIFIC NATURAL LANGUAGE PROCESSING MODEL

(71) Applicant: Bristol-Myers Squibb Company, Summit, NJ (US)

(72) Inventors: Sameen Mayur Desai, Morris Plains, NJ (US); Grigoriy Aleksandrovich Serbarinov, Summit, NJ (US)

(73) Assignee: Bristol-Myers Squibb Company, Princeton, NJ (US)

( * ) Notice: Subject to any disclaimer, the term of this patent is extended or adjusted under 35 U.S.C. 154(b) by 790 days.

(21) Appl. No.: 17/547,017

(22) Filed: Dec. 9, 2021

(65) Prior Publication Data

US 2022/0179906 A1    Jun. 9, 2022

Related U.S. Application Data

(60) Provisional application No. 63/123,336, filed on Dec. 9, 2020.

(51) Int. Cl.
| | |
|---|---|
| *G06F 16/906* | (2019.01) |
| *G06F 16/93* | (2019.01) |
| *G06F 40/216* | (2020.01) |
| *G06F 40/295* | (2020.01) |
| *G06N 3/044* | (2023.01) |

(Continued)

(52) U.S. Cl.
CPC ............ *G06F 16/906* (2019.01); *G06F 16/93* (2019.01); *G06F 40/216* (2020.01); *G06F 40/295* (2020.01); *G06N 3/044* (2023.01); *G06N 3/045* (2023.01); *G06N 3/08* (2013.01)

(58) Field of Classification Search
CPC ...... G06F 16/906; G06F 16/93; G06F 40/216; G06F 40/295; G06F 40/268; G06F 40/284; G06F 40/117; G06F 40/20; G06F 16/38; G06F 16/383; G06F 16/35; G06F 16/353; G06F 16/313; G06F 17/274; G06F 3/0482; G06N 3/044; G06N 3/045; G06N 3/08; G06N 20/00; G06V 10/82; G06V 30/153

See application file for complete search history.

(56) References Cited

U.S. PATENT DOCUMENTS

| | | | |
|---|---|---|---|
| 10,599,767 B1 * | 3/2020 | Mattera ................. | G06F 40/242 |
| 2002/0022956 A1 * | 2/2002 | Ukrainczyk ............ | G06F 40/20 707/E17.084 |

(Continued)

FOREIGN PATENT DOCUMENTS

| | | |
|---|---|---|
| JP | 2009271573 A | 11/2009 |
| WO | 20020051249 A1 | 7/2002 |

OTHER PUBLICATIONS

Krishnan Praveen et al: "Bringing semantics into word image representation", Pattern Recognition., vol. 108, Jul. 12, 2020 (Jul. 12, 2020), p. 107542, XP055901241, ISSN: 0031-3203, DOI: 10.1016/j.patcog.2020.107542.

(Continued)

*Primary Examiner* — Yogeshkumar Patel
(74) *Attorney, Agent, or Firm* — Honigman LLP; Grant Griffith; Jonathan O'Brien

(57) ABSTRACT

Provided herein are system, apparatus, device, method, and/or computer program product embodiments, and/or combinations and sub-combinations thereof, for classifying a document using CNN and BiLSTM.

16 Claims, 12 Drawing Sheets

(51) Int. Cl.
*G06N 3/045* (2023.01)
*G06N 3/08* (2023.01)

(56) References Cited

U.S. PATENT DOCUMENTS

| | | | | |
|---|---|---|---|---|
| 2015/0019461 | A1* | 1/2015 | Simard | G06F 40/242 |
| | | | | 706/11 |
| 2016/0092793 | A1 | 3/2016 | Garrow et al. | |
| 2016/0098645 | A1* | 4/2016 | Sharma | G06N 7/01 |
| | | | | 706/12 |
| 2020/0065374 | A1 | 2/2020 | Gao et al. | |
| 2020/0327381 | A1* | 10/2020 | Tan | G06F 40/284 |

OTHER PUBLICATIONS

Anonymous: "Word embedding—Wikipedia", Dec. 7, 2020 (Dec. 7, 2020), XP055901294, Retrieved from the Internet: URL:https://en.wikipedia.org/w/index.php? title=Word_embedding&oldid=992864235 [retrieved on Mar. 15, 2022].

Rowtula Vijay et al: "POS Tagging and Named Entity Recognition on Handwritten Documents", International Conference on Natural Language Processing, Dec. 1, 2018 (Dec. 1, 2018), XP055900804, Retrieved from the Internet: URL:http://cdn.iiit.ac.in/cdn/cvit.iiit.ac.in/images/ ConferencePapers/2018/pos_tagging_ICON18.pdf [retrieved on Mar. 14, 2022].

EPO. Office Action relating to application No. 21839756.0, dated Jul. 12, 2024.

JPO. Office Action relating to application 2023-535028, dated Jul. 2, 2024.

* cited by examiner

FIG. 4

FIG. 9 NLP based summarizer — Create filters for automating alerts

CLASSIFYING DOCUMENTS USING A DOMAIN-SPECIFIC NATURAL LANGUAGE PROCESSING MODEL

CROSS-REFERENCE TO RELATED APPLICATIONS

This application claims priority to U.S. Provisional Application No. 63/123,336 filed on Dec. 9, 2020, the contents of which are incorporated herein by reference in their entirety.

BACKGROUND

Entities, such as companies, government institutions, educational institutions, or the like, often receive thousands of documents that include a combination of text, images, charts, tables, and other forms of data/information/knowledge representations. These documents may be of different types, including MICROSOFT WORD, MICROSOFT EXCEL documents, png, tiff, jpg, raw, gif, PDFs, emails, txt files, handwritten notes, HTML, XML scanned documents, or the like. Manually classifying and prioritizing such documents based on their content may be a burdensome and error-prone task. Entities have attempted to automate the process using certain machine-learning algorithms, such as natural language processing (NLP). However, conventional NLP models often fall short of accurately classifying documents. For example, conventional NLP models cannot assign domain-specific labels to words or phrases to accurately classify the documents.

Moreover, manual extraction of information or highly intelligent third-party tools to extract the text contents of each PDF with acceptable accuracy (e.g., optical character recognition (OCR)) and correctly extract and piece these data back together in a machine-readable format is onerous, time-intensive, and error-prone. Furthermore, conventional methodologies implementing conventional machine-learning models may face many obstacles when attempting to extract text from a document, such as optical clarity, alphanumeric characters, orientation, or the like. Therefore, conventional methods of classifying and prioritizing documents may be burdensome, costly, and error-prone.

SUMMARY

Provided herein are system, apparatus, device, method, and/or computer program product embodiments, and/or combinations and sub-combinations thereof, for classifying documents using a domain-specific NLP model.

In a given embodiment, a method for classifying documents includes the steps of receiving, by one or more computing devices, a set of documents and metadata for each document in the set of documents. The set of documents corresponds to a domain. The method further includes generating, by the one or more computing devices, a set of word embeddings for each document of the set of documents. Each word embedding includes one or more words from a respective document. The method further includes tokenizing, by the one or more computing devices, each word embedding of the set of word embeddings into a set of segments. Each segment includes a word from the word embedding. Furthermore, the method includes training, by the one or more computing devices, a learning model to classify each document of the set of documents of the domain by recursively: breaking down, by the one or more computing devices, each of the segments of the set of segments of each document of the set of documents into a set of features; assigning, by the one or more computing devices, a part-of-speech tag to each of the segments of the set of segments for each document of the set of documents, based on predetermined weights assigned to each feature of the set of features of a corresponding segment; assigning, by the one or more computing devices, a dependency tag to each of the each of the segments of the set of segments of each document of the set of documents, based on the part-of-speech tag assigned to the corresponding segment and the predetermined weights assigned to each feature of the set of features of the corresponding string; assigning, by the one or more computing devices, a Named Entity Recognition (NER) label from a set of predefined labels corresponding to the domain, to each of the segments of the set of segments of each document of the set of documents, based on the part-of-speech tag and dependency tag assigned to the corresponding segment, and the predetermined weights assigned to each feature of the set of features of the corresponding segment; and validating, by the one or more computing devices, the assigned NER labels by comparing the metadata for each document to the assigned NER labels of the respective document.

In a given embodiment, a system of classifying documents includes a memory and a processor coupled to the memory. The processor is configured to receive a set of documents and metadata for each document in the set of documents. The set of documents corresponds to a domain. The processor is further configured to generate a set of word embeddings for each document of the set of documents. Each word embedding includes one or more words from a respective document. The processor is further configured to tokenize each word embedding of the set of word embeddings into a set of segments. Each segment includes a word from the word embedding. Furthermore, the processor is further configured to train a learning model to classify each document of the set of documents of the domain by recursively: breaking down each of the segments of the set of segments of each document of the set of documents into a set of features; assigning a part-of-speech tag to each of the segments of the set of segments for each document of the set of documents, based on predetermined weights assigned to each feature of the set of features of a corresponding segment; assigning a dependency tag to each of the each of the segments of the set of segments of each document of the set of documents, based on the part-of-speech tag assigned to the corresponding segment and the predetermined weights assigned to each feature of the set of features of the corresponding string; assigning, by the one or more computing devices, a Named Entity Recognition (NER) label from a set of predefined labels corresponding to the domain, to each of the segments of the set of segments of each document of the set of documents, based on the part-of-speech tag and dependency tag assigned to the corresponding segment, and the predetermined weights assigned to each feature of the set of features of the corresponding segment; and validating the assigned NER labels by comparing the metadata for each document to the assigned NER labels of the respective document.

In a given embodiment, a non-transitory computer-readable medium having instructions stored thereon, execution of which, by one or more processors of a device, causes the one or more processors to perform operations comprising receiving a set of documents and metadata for each document in the set of documents. The set of documents corresponds to a domain. The operations further include generating a set of word embeddings for each document of the set of documents. Each word embedding includes one or more words from a respective document. The operations further include tokenizing each word embedding of the set of word embeddings into a set of segments. Each segment includes a word from the word embedding. Furthermore, the operations include training a learning model to classify each document of the set of documents of the domain by recursively: breaking down each of the segments of the set of segments of each document of the set of documents into a set of features; assigning a part-of-speech tag to each of the segments of the set of segments for each document of the set of documents, based on predetermined weights assigned to each feature of the set of features of a corresponding segment; assigning a dependency tag to each of the each of the segments of the set of segments of each document of the set of documents, based on the part-of-speech tag assigned to the corresponding segment and the predetermined weights assigned to each feature of the set of features of the corresponding string; assigning, by the one or more computing devices, a Named Entity Recognition (NER) label from a set of predefined labels corresponding to the domain, to each of the segments of the set of segments of each document of the set of documents, based on the part-of-speech tag and dependency tag assigned to the corresponding segment, and the predetermined weights assigned to each feature of the set of features of the corresponding segment; and validating the assigned NER labels by comparing the metadata for each document to the assigned NER labels of the respective document.

In a given embodiment, a method for classifying documents includes receiving, by the one or more computing devices, a request to classify a document corresponding to the domain; generating, by the one or more computing devices, a word embedding including one or more words of the document; and tokenizing, by the one or more computing devices, the word embedding corresponding to the domain into a set of segments. The method further includes breaking down, by the one or more computing devices, each of the one or more strings of the document into a new set of features; assigning, by the one or more computing devices, a part-of-speech tag to each new segment of the set of segments of the new document, based on predetermined weights assigned to each feature of the set of features of a corresponding segment, using a trained learning model; assigning, by the one or more computing devices, a dependency label to each of the segments of the set of segments of the document, based on the part-of-speech tag assigned to the corresponding segment and the predetermined weights assigned to each feature of the set of features of the corresponding segment, using the trained learning model; assigning, by the one or more computing devices, a NER label from the set of predefined labels corresponding to the domain, to each of the segments of the set of segments of the document, based on the part-of-speech tag and dependency tag assigned to the corresponding segment, and the predetermined weights assigned to each feature of the set of features of the corresponding segment, using the trained learning model; and classifying, by the one or more computing devices, the document corresponding to the domain based on the assigned NER labels, using the trained learning model.

In a given embodiment, a method for training an NLP model includes the step of receiving, by one or more computing devices, a set of documents and metadata for each document in the set of documents. The set of documents corresponds to pharmacovigilance. The method further includes generating, by the one or more computing devices, a set of word embeddings for each document of the set of documents. Each word embedding includes one or more words from a respective document. The method further includes tokenizing, by the one or more computing devices, each word embedding of the set of word embeddings into a set of segments. Each segment includes a word from the word embedding. Furthermore, the method includes training, by the one or more computing devices, a learning model to classify each document of the set of documents of the domain by recursively: breaking down, by the one or more computing devices, each of the segments of the set of segments of each document of the set of documents into a set of features; assigning, by the one or more computing devices, a part-of-speech tag to each of the segments of the set of segments for each document of the set of documents, based on predetermined weights assigned to each feature of the set of features of a corresponding segment; assigning, by the one or more computing devices, a dependency tag to each of the each of the segments of the set of segments of each document of the set of documents, based on the part-of-speech tag assigned to the corresponding segment and the predetermined weights assigned to each feature of the set of features of the corresponding string; assigning, by the one or more computing devices, a Named Entity Recognition (NER) label from a set of predefined labels corresponding to pharmacovigilance, to each of the segments of the set of segments of each document of the set of documents, based on the part-of-speech tag and dependency tag assigned to the corresponding segment, and the predetermined weights assigned to each feature of the set of features of the corresponding segment; and validating, by the one or more computing devices, the assigned NER labels by comparing the metadata for each document to the assigned NER labels of the respective document. In response to fully training the learning model, the learning model is configured to classify pharmacovigilance documents based on case validity, seriousness, fatality, and causality.

In a given embodiment, a method for classifying pharmacovigilance documents using a Natural Language Processing (NLP) model includes receiving, by one or more computing devices, a request to classify a pharmacovigilance document; generating, by the one or more computing devices, an output including Named Entity Recognition (NER) labels for one or more words in the pharmacovigilance document using a learning model configured to implement a combination of Convolutional Neural Network (CNN) and Bidirectional Long-Term-Short-Term (BiLSTM) algorithms; and classifying, by the one or more computing devices, the pharmacovigilance document using the NER labels based on case validity, seriousness, fatality, and causality.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

FIG. 4 illustrates an example document used for training the learning model, according to an example embodiment.

FIG. 9 illustrates a fully trained learning model summarizing a document, according to an example embodiment.

The drawing in which an element first appears is typically indicated by the leftmost digit or digits in the corresponding reference number. In the drawings, like reference numbers may indicate identical or functionally similar elements.

DETAILED DESCRIPTION

Figure 1:
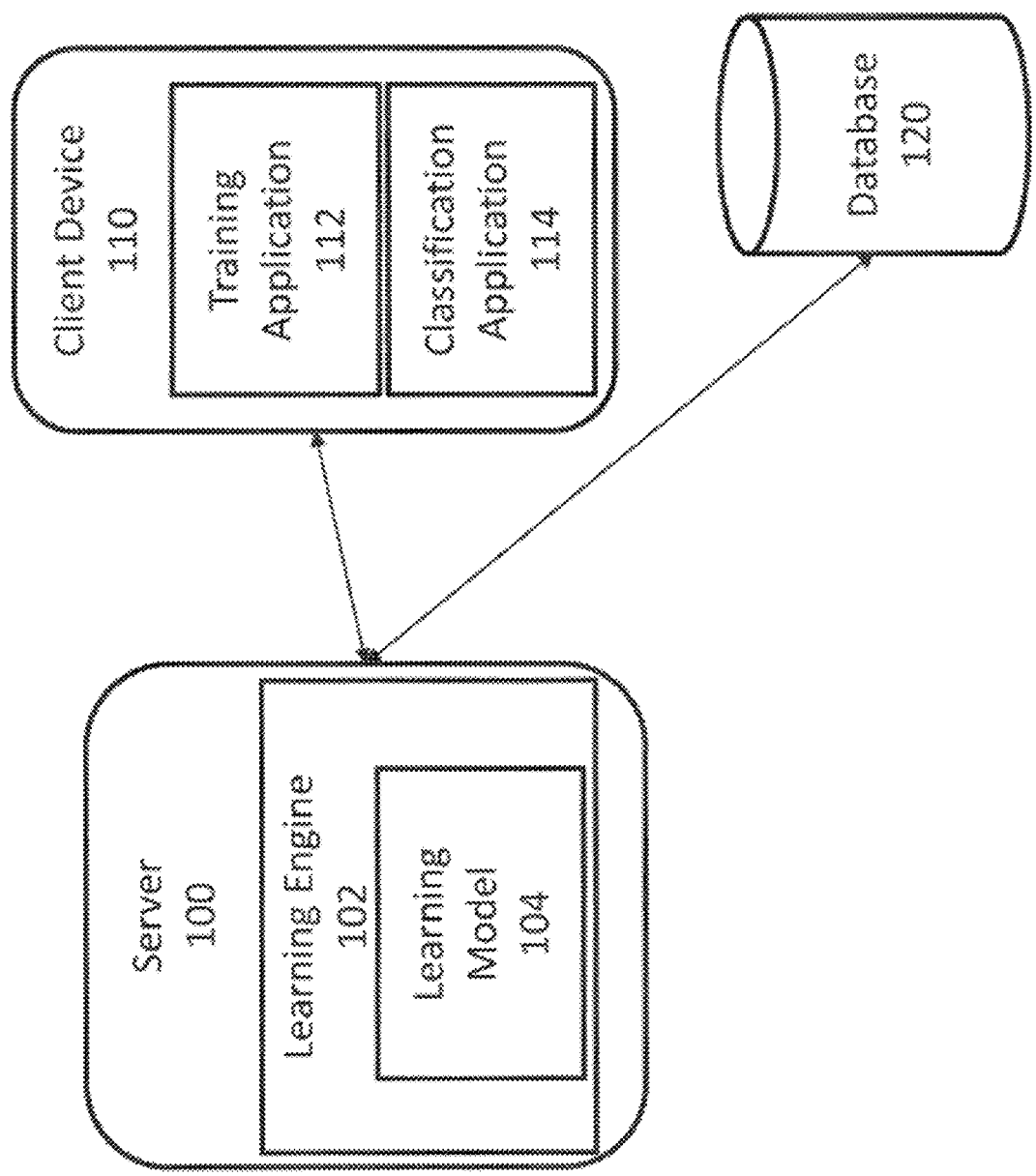
FIG. 1 is a block diagram of a system for classifying documents using a domain-specific NLP model, according to an example embodiment.

Provided herein are system, apparatus, device, method, and/or computer program product embodiments, and/or combinations and sub-combinations thereof, for classifying documents using image analysis.

As described above, conventional methods for classifying and prioritizing documents may be burdensome, costly, and error-prone. For example, in the field of pharmacovigilance (PV) operations, companies receive individual case safety reports (ICSRs) regarding various drugs. An ICSR is a written report of an adverse event experienced by a patient undergoing a particular treatment or taking a particular drug, which may potentially be linked to that treatment or drug.

For an ICSR to be considered "valid," the ICSR must contain information related to four elements: an identifiable patient, an identifiable reporter, a suspect drug, and an adverse event. If an ICSR is valid, it is determined whether the adverse event described is a "serious" adverse event. An adverse event is a serious adverse event if it satisfies one of the following requirements: results in death or is life-threatening, requires inpatient hospitalization or extends an existing hospitalization; results in persistent or significant disability or incapacity; results in a congenital disability; or is otherwise medically significant because treatment and/or intervention is required to prevent one of the preceding requirements. Furthermore, when performing clinical trials of drugs or other products, it may be determined whether an adverse effect indicated in the ICSR form is a serious unexpected result adverse reaction (SUSAR).

An ICSR may correspond with a particular case. Different regulatory organizations may require action to be taken on cases having a corresponding ICSR. Regulatory organizations may provide different timelines for different cases. For example, if a case includes a serious adverse effect listed in the ICSR, the case may be prioritized so that a company can take action on this case. Conversely, if a case includes a non-serious adverse effect in the ICSR, the case may be given a lower priority.

An ICSR may be provided in various formats, such as MICROSOFT WORD, MICROSOFT EXCEL documents, png, tiff, jpg, raw, gif, emails, PDFs, txt files, handwritten notes, HTML, XML scanned documents, or the like. An ICSR document may also be a combination of multiple formats. For example, an ICSR document may be in .doc format; however, it may also include an embedded JPEG image. In another example, a portion of the ICSR document may be an email message as while another portion may be in an MS Word or MS Excel format.

The ICSR may come from various reporters, such as a pharmacy, a clinician, or a patient. Furthermore, each of the documents may include a reported adverse effect of a drug along with other information about the drug. A company may need to determine, for example, whether the document is a valid ICSR report, a seriousness of an adverse effect listed in the ICSR document, and a seriousness, relatedness, and expectedness (SRE) of an adverse effect listed on the ICSR document, based on the content of the document. Given the number of reports and various types of formats of the reports, classifying the reports in such a manner may prove to be a challenging task. Therefore, conventional methods may not be able to classify ICSR reports effectively and efficiently.

For example, conventional methods may include a subject matter expert (SME) manually reviewing each ICSR document and making a determination. An individual may manually extract relevant information from an ICSR document and input the information into a database, which is subsequently reviewed by a medical professional to classify the ICSR document. However, companies may receive thousands of ICSR documents over a short time period. Given the large number of ICSR documents that may be received by a company, the manual review of the ICSR documents may be a burdensome task. Furthermore, many ICSR documents may be irrelevant as they may not be valid documents, may not indicate a serious effect, or may not indicate a serious, related, or expected effect. This can create large backlogs and delays in processing the relevant and important ICSR documents.

Conventional methods may also include using machine-learning algorithms that require the documents to be converted to text (e.g., through optical character recognition (OCR)) prior to operation. However, given the complexity of OCR and creating normalized templates, conventional machine-learning algorithms require significant time and human and financial resources to train and implement and update the algorithms. As such, these machine-learning algorithms can be operationally inefficient and costly to train and implement.

In a given embodiment, a server may receive a request to train a learning model to classify documents and identify entities within the documents specific to a domain. For example, the learning model may identify the entities within the documents to automatically summarize the document. The content of the documents may include one or more strings. Furthermore, the documents may include corresponding metadata. The metadata may be annotations that label one or more strings in the document. The annotations may be specific to the domain.

The server may train a learning model to classify the documents specific to the domain by generating a word embedding for each document. The server may tokenize each word embedding into segments, including one or more words of each word embedding. The server may train the learning model by recursively breaking down each of the segments of each document into a set of features, assigning a part-of-speech tag to the one or more words corresponding to each respective segment of each respective document based on predetermined weights assigned to each feature of the set of features of the respective segment, and assigning a dependency label to the one or more words corresponding to each respective segment of each respective document based on the part-of-speech tag assigned to the respective one or more words and the predetermined weights assigned to each feature of the set of features of the respective segment. Training the learning model may further include recursively assigning a Name Entity Relationship (NER) label from a set of predefined labels corresponding to the domain, to the one or more words corresponding to each respective segment of each respective document, based on the part-of-speech tag and dependency tag assigned to the respective one or more words, and the predetermined weights assigned to each feature of the set of features of the respective segment and validating the assigned labels by comparing the metadata for each document to the assigned labels of the respective document.

The server may receive a request to classify a document corresponding to the domain using the trained learning model, trained to classify documents specific to the domain. The server may tokenize the document into segments, including one or more words of one or more strings of the document. The server may break down each of the segments of the document into a set of features. The server may assign a part-of-speech tag to the one or more words corresponding to each respective segment of the document based on predetermined weights assigned to each feature of the set of features of the respective segment. The server may assign a dependency label to the one or more words corresponding to each respective segment based on the part-of-speech tag assigned to the respective one or more words and the predetermined weights assigned to each feature of the set of features of the respective segment. Furthermore, the server may assign a Name Entity Relationship (NER) label from the set of predefined labels corresponding to the domain to the one or more words corresponding to each respective segment based on the part-of-speech tag and dependency tag assigned to the respective one or more words, and the predetermined weights assigned to each feature of the set of features of the respective segment. The server may classify the document based on each of the NER labels assigned to the words in the document.

The above configuration allows for processing and classifying multiple document formats and languages without transcribing and retrieving data from source documents. The above configuration reduces data entry for case processing and enables inferential analyses and searches for signal management. Therefore, the above configuration bypasses text processing, including but not limited to transcription and translation, by leveraging a domain-specific NLP that implements a Convolutional Neural Network (CNN) in conjunction with a Bidirectional Long Short-Term Memory (BiLSTM) model. This methodology increases the speed at which models may be trained to understand domain concepts within the PV domain. Moreover, the above configuration minimizes the effort of training and maintenance of a conventional NLP model.

Furthermore, the above configuration allows for using a domain-specific NLP model to label one or more strings in the documents so that documents are more accurately classified. For example, the NLP model can be specific to the PV. Therefore, the NLP model can be successfully used across the PV systems.

FIG. 1 is a block diagram of a system for classifying documents using a domain-specific NLP model. The system may include a server 100, client device 110, and database 120. The devices of the system may be connected through a network. For example, the system's devices may be connected through wired connections, wireless connections, or a combination of wired and wireless connections. In an example embodiment, one or more portions of the network may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks. Alternatively, server 100, client device 110, and database 120 may be located on a single physical or virtual machine.

In some embodiments, server 100 and database 120 may reside in a cloud-computing environment. In other embodiments, server 100 may reside in a cloud-computing environment, while database 120 resides outside the cloud-computing environment. Furthermore, in other embodiments, server 100 may reside outside the cloud-computing environment, while database 120 resides in the cloud-computing environment.

Client device 110 may be a device operated by individuals associated with the administrator of server 100 (e.g., programmers, users, etc.). Client device 110 may include a training application 112 and classification application 114. The cloud-computing environment may also host training application 112 and classification application 114. Alternatively, one or both of training application 112 and classification application 114 may be installed on client device 110.

Training application 112 and classification application 114 may be executable applications configured to interface with server 100. Training application 112 may transmit requests to server 100 to train a learning model to classify documents using image analysis. Classification application 114 may be configured to transmit requests to server 100 to classify a document using a learning model. Classification application 114 may also be installed on and executed by third-party user devices. In this regard, authorized third parties may transmit requests to classify documents using server 100. The documents may be stored in database 120. Database 120 may be one or more data storage devices configured to store documents of various types and formats.

Learning engine 102 may include a learning model 104. Learning model 104 may implement a Natural Language Processing (NLP) framework, which is configured to recursively implement a deep machine-learning algorithm, such as a convolutional neural network (CNN) and BiLSTM, to classify and prioritize documents. Learning model 104 may be a domain-specific learning model configured to classify documents specific to the domain. Learning model 104 may assign multiple classifications to a given document. Moreover, learning model 104 may be configured to summarize a given document. Each of the classifications will be explained in further detail below. In some embodiments, fewer or additional learning modules may be used to classify documents.

Figure 2:
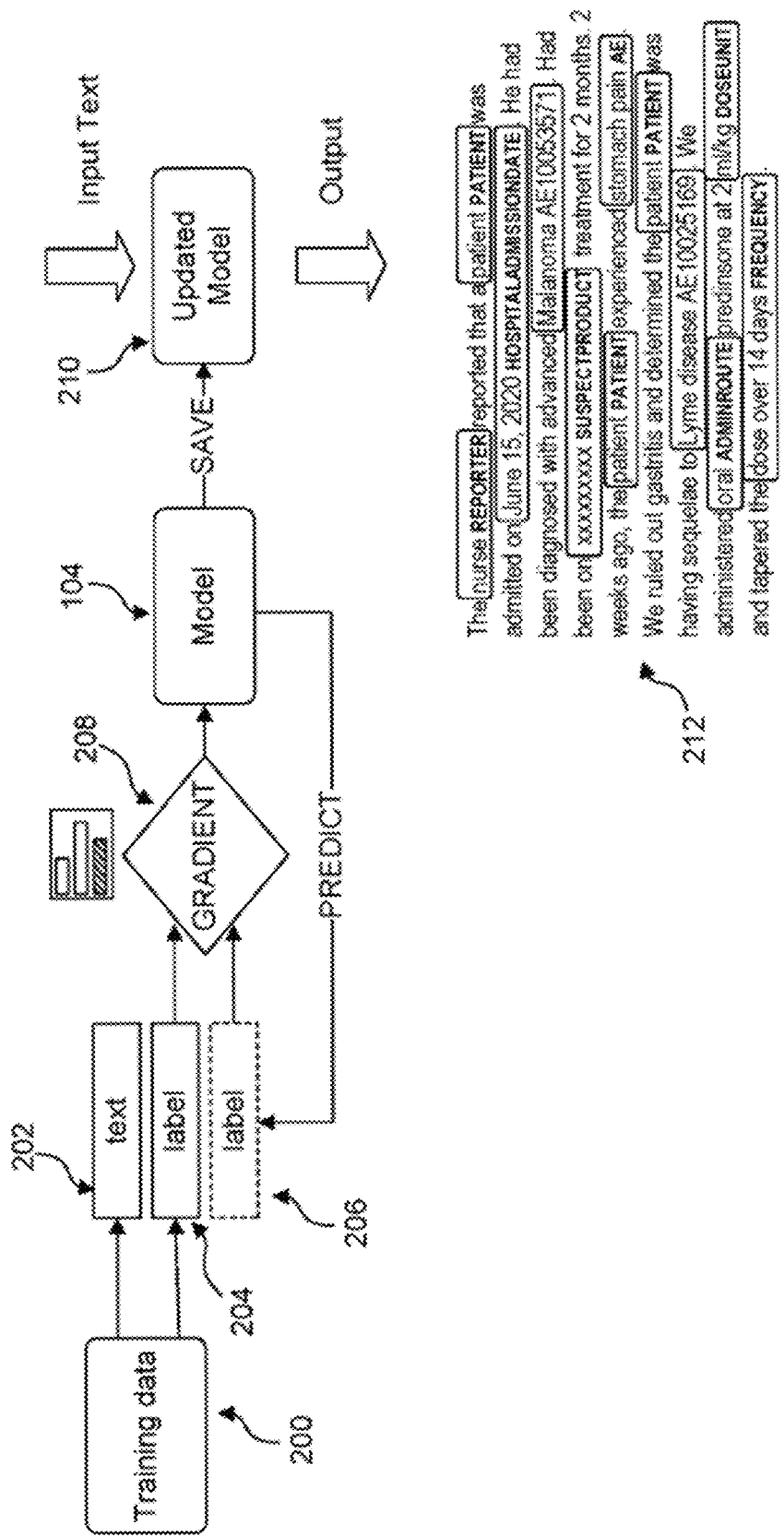
FIG. 2 is a block diagram illustrating a process of training a learning model to classify documents, according to an example embodiment.

FIG. 2 is a block diagram illustrating a process of training a learning model to classify documents, according to an example embodiment. FIG. 2 will be described in reference to FIG. 1. In a given embodiment, client device 110 may receive a request to train learning model 104 to classify documents corresponding to a domain. Learning model 104 may be an NLP framework configured to implement CNN and Bidirectional Long-Term-Short-Term (BiLSTM) algorithms to classify documents.

Training application 112 may build a statistical NER model. The statistical NER model can be used to implement a rule-based recognition system. For example, the statistical NER model may provide rules specific to the domain on how to tag strings in documents. Moreover, the statistical NER model may be a dictionary or ontology used by learning model 104 to recognize words or phrases in a document. The statistical NER model may be specifically tied to a particular domain. For example, A statistical NER model built using MedDRA may include terminology or phraseology specifically corresponding with concepts in the PV domain. Training application 112 may load the statistical NER model in learning model 104. The statistical NER model may be used in combination with a standard language (e.g., English, Spanish, French, etc.).

The request may include training data 200. Training data 200 can include documents (and concepts) corresponding to the domain. The documents can include text 202 (e.g., one or more strings) and labels 204 assigned to text 202. Labels 204 can be from a predefined set of labels corresponding to the domain. Moreover, each label of the labels 204 may be assigned to one or more strings (e.g., a word or a phrase) of text 202. The label assigned to one or more strings may define the string. For example, labels 204 may correspond with entities or fields of a specific domain. As such, a given label of the labels 204 assigned to a given string indicates that the given string corresponds to a given entity or field of the specific domain. Labels 204 may be included in the metadata for each document.

Training application 112 may transmit training data 200, labels (e.g., metadata) 204 corresponding to training data 200, and parameters to learning engine 102 for training learning model 104. Learning engine 102 may receive training data 200 and labels 204.

Learning model 104 may generate word embeddings for each of the documents in training data 200. The word embeddings may be vector representations of the words of the documents. The vector may be an n-dimensional vector space in which words that share common context and semantics are located close in proximity to one another in the vector space. Learning model 104 may use bloom embeddings for each of the documents in training data 200. Bloom embeddings are compact vector representations of words of the documents. Word embeddings or bloom embeddings can be generated using the statistical NER model.

Learning model 104 may tokenize the word embeddings (or bloom embeddings) into segments of words, letters, punctuation, or the like. Tokenization segments each document based on rules that are specific to a language and specific domain. Moreover, learning model 104 may use the statistical model to segment each document. For example, if a given document includes the phrase "I live in the U.S.A.", learning application 112 may determine that the first period after "U.S.A." corresponds with the abbreviation of "U.S.A." and the second period corresponds with the end of the sentence. Therefore, tokenization of the phrase may be segmented as follows: [I] [live] [in] [the] [U.S.A.] [.] Each segment may include a single word, a partial word, or more than one word.

Learning model 104 may implement a CNN algorithm to break down each segment into a set of features and generate a vector (e.g., one-dimensional vector) corresponding to each of the segments using the set of features of each respective segment. Learning model 104 may assign weights to each of the set of features. The CNN algorithm will be described in further detail with respect to FIG. 3.

Learning model 104 may apply the weights to the vector to generate a resultant vector. The weights may be included in the parameters received from training application 112. Learning model 104 may assign a part-of-speech tag to the words in the segment corresponding to the vector, based on the resultant vector and the statistical NER model. The part-of-speech tag may indicate whether a word is a noun, verb, adjective, etc. Learning model 104 may predict the part of speech of a word in a segment given the context. For example, learning model 104 may determine that a word following the word "the" must be a noun based on English language rules. Learning model 104 may use predefined rules to make inferences regarding the words and phrases in the documents and identify relationships between the words in the documents. Moreover, learning model 104 may use the word embeddings to identify relationships between the words. Furthermore, learning model 104 may use the statistical NER model, which includes domain-specific dictionaries and ontologies, to understand the vocabulary used in the documents.

Learning model 104 may also assign dependency tags to the words in each segment of each respective document based on the resultant vector corresponding to each segment, the statistical NER model, and the part-of-speech tag assigned to the words in each segment. The dependency tags may define a relationship between two more words. For example, in the phrase "lazy dog," learning engine 104 may determine that the word "lazy" modifies "dog." This dependency may be represented by a tag (e.g., amod tag). Learning model 104 may use predefined rules to make inferences regarding the words and phrases in the documents and identify relationships between the words in the documents. Moreover, learning model 104 may use the word embeddings to identify relationships between the words. Furthermore, learning model 104 may use the statistical NER model, which includes domain-specific dictionaries and ontologies, to understand the vocabulary used in the documents.

Learning model 104 may assign a NER label to the words in each segment of each respective document based on the resultant vector corresponding to each segment, the statistical NER model, and the part-of-speech and dependency tags assigned to the respective words in each segment. The NER label may be selected from a predefined set of labels corresponding to the domain. The NER label indicates that the word corresponds with a field or entity of the domain. Learning model 104 may use predefined rules to make inferences regarding the words and phrases in the documents and identify relationships between the words in the documents. Moreover, learning model 104 may use the word embeddings to identify relationships between the words. Furthermore, learning model 104 may use the statistical NER model, which includes domain-specific dictionaries and ontologies, to understand the vocabulary used in the documents.

Learning model 104 may validate NER labels assigned to the words of each document based on the respective labels 204 corresponding to each document. Based on the validation results and a gradient 208, learning model 104 may modify the weights assigned to each feature, tokenize each document to generate new segments for each document, generate a new vector based on the new segments and new weights, assign a parts-of-speech tag to the words of the new segments based on the new vector, assign a dependency tag to the words of the new segments based on the parts-of-speech tag assigned to the words and the new vector, assign a NER label to the words of the new segments based on the parts-of-speech and dependency tags assigned to the words, and the new vector, and validate the NER labels based on the labels 204. Learning model 104 may recursively modify the weights and perform these steps until learning model 104 assigns NER labels at a desired accuracy. In some embodiments, the part-of-speech tags and dependency tags may also be validated.

Once learning model 104 is assigning NER labels at a desired accuracy, the learning model 104 may become a fully trained learning model 210. Fully trained learning model 210 is illustrated as a different component of learning model 104. Fully trained learning model 210 illustrates the process of training the learning model 104. However, it is to be appreciated that learning model 104 may remain the same component in the system even after becoming fully trained.

Client device 110 may receive a request to classify a document using fully trained learning model 210. The request may include the document. Classification application 114 may transmit the document and parameters to fully trained learning model 210. Fully trained learning model 210 may generate word embeddings (or bloom embeddings) for the documents.

Fully trained learning model 210 may tokenize the word embeddings (or bloom embeddings) to generate segments for the document, generate a vector based on the segments and weights included in the parameters, assign a parts-of-speech tag to the words of the segments based on the statistical NER model and vector, assign a dependency tag to the words of the segments based on the parts-of-speech tag assigned to the words, the statistical NER model, and the vector, assign a NER label to the words of the segments based on the parts-of-speech and dependency tags assigned to the words, the statistical NER model, and the vector. Fully trained learning model 210 may generate output 212 in response to assigning the NER labels. Moreover, fully trained learning model 210 may classify the document based on the NER labels.

In some embodiments, fully trained learning model 210 may extract the words and phrases from the document and their respective NER labels. Fully trained learning model 210 may use the extracted words and phrases and their respective NER labels from the document, along with extracted words and phrases and their respective NER labels from other documents, to build a knowledge base. The knowledge base may be a graph-based structure including nodes connected using edges. The nodes may contain the extracted words and phrases and their respective NER labels. Fully trained learning model 210 may connect the nodes using an edge based on identifying a relationship between the nodes. Fully trained learning model 210 may determine the relationship between the nodes storing words or phrases based on the NER label of the respective words or phrases. The knowledge base may be stored in database 120.

As a non-limiting example, the above-described system for classifying documents using image analysis may be used to classify ICSR documents. ICSR documents may also include literature articles and clinical reports. As discussed above, ICSR documents include information about the patient, geography, adverse effects, ICSR quality and compliance characteristics, benefit-risk characteristic, product details, study details, and consumer complaints, legal concepts, or other medical concepts associated with the use of FDA regulated products. Companies in the pharmaceutical space may need to process the ICSR documents to determine whether any action is needed for a particular product.

The ICSR workflow may include three process blocks: case intake, case processing, and case reporting. Upon intake, PV departments globally receive ICSRs from different sources in various formats and languages. Reports come from different reporters, healthcare professionals, and non-healthcare professionals, and through various mediums, such as email, fax, mail, and phone. Several important assessments are made upon case intake, critical in routing cases given their severity, to meet pre-defined regulatory guidelines.

Compliance with regulatory authorities is determined based on reportability to country-specific regulatory authorities within respective specified timelines. Therefore, upfront prioritization should be accurate to limit the propagation of work effort being performed on less urgent reports. Assessment for prioritization may include the following key characteristics: case validity (valid or non-valid), case seriousness (serious or non-serious), relatedness (related or non-related to the suspect product), and an SRE of an adverse effect (labeled or unlabeled). Case validity may indicate whether the ICSR document is a valid document. Case seriousness may indicate whether an adverse effect listed in the ICSR document is serious or non-serious. SRE may indicate whether an adverse effect is a serious, related, and expected (e.g., labeled on the product) effect.

A company may need to take action with regard to a specific product if an adverse effect listed in a valid ICSR document is serious and unexpected. As a result, learning model 104 may be trained to classify a given ICSR document's case validity, seriousness, fatality, and causality. Learning model 104 may also be trained to identify adverse effects in the structured product labels (SPLs) for FDA-approved drugs for expectedness and identify potential off-label product usage. Moreover, learning model 104 may be trained to identify entities within documents. Learning model 104 may be used to generate summaries of the documents based on the identified entities. Learning model 104 may be trained to understand the context of the document such that an accurate summary of the document can be generated.

For example, client device 110 may receive a request to train learning model 104 to classify ICSR documents corresponding to the PV domain. Learning model 104 may be a NLP framework configured to implement CNN and BiLSTM algorithms to classify documents.

As a non-limiting example, learning model 104 may implement spaCy, spaCy (v2.0), or MedSpaCy. SpaCy (v2.0) is an open-source software library for advanced NLP utilizing a state-of-the-art convolutional neural network (CNN) model with residual connections and layer normalization maxout non-linearity. SpaCy provides much better efficiency than the standard BiLSTM solution for tagging, parsing, named entity recognition, and deep learning integration. In addition, spaCy has GloVe (global vector) support functionality in the English language model. The maximum size of the vector is 2.2 million for GloVe.840B.300d Common Crawl (840B tokens, 2.2 M vocab, cased, 300d vectors). An internally-implemented bloom embedding strategy using sub-word features was used to support effective handling of the sizeable MedDRA vocabulary.

Training application 112 may build a statistical NER model. For example, training application 112 may embed 81,900 MedDRA entities to create a statistical NER model. Training application 112 may also use the Unified Medical Language System (UMLS) to build the statistical NER model. The statistical NER model may be incorporated as spaCy EntityRuler search pattern attributes. The statistical NER model may be a dictionary or ontology used by learning model 104 to recognize words or phrases in an ICSR document. Training application 112 may load the statistical NER model in learning model 104. The statistical NER model may be used in combination with a standard language (e.g., English, Spanish, French, etc.).

The request may include training data 200. Training data 200 can include ICSR documents. The documents can include text 202 (e.g., one or more strings) and labels 204 assigned to text 202. Labels 204 can be from a predefined set of labels corresponding to the PV domain. Moreover, each label of the labels 204 may be assigned to one or more strings (e.g., a word or a phrase) of text 202. The label assigned to one or more strings may define the string. For example, labels 204 may correspond with entities or fields of the PV domain. As such, in an embodiment, a given label of the labels 204 assigned to a given string indicates that the given string corresponds to a given entity or field of the PV domain. Labels 204 may be included in the metadata for each document.

As an example, labels 204 can include the following entities:

| Entity | F1 |
| --- | --- |
| SuspectProduct | 0.99 |
| TestName | 0.95 |
| TestRange | 0.94 |
| AdminRoute | 0.93 |
| ProductDose | 0.93 |
| ConcomitantProduct | 0.93 |
| Sex | 0.91 |
| AE | 0.91 |
| Frequency | 0.88 |
| DoseForm | 0.88 |
| TestResultUnit | 0.88 |
| Patient | 0.87 |
| ProductStartDate | 0.87 |
| MedicalHistory | 0.85 |
| TestResult | 0.83 |
| ReporterSeriousnessImportantmedicalevent | 0.83 |
| ReporterCausalitySuspected | 0.82 |
| ArticleTitle | 0.80 |
| Severity | 0.80 |
| AuthorName | 0.79 |
| ReporterCausallityNotRelated | 0.78 |
| JournalName | 0.78 |
| ReporterSeriousnessHospitalization | 0.77 |
| ProductStopDate | 0.77 |
| TestDate | 0.77 |
| Outcome | 0.76 |
| Indication | 0.74 |
| Race | 0.73 |
| TreatmentProduct | 0.69 |
| AgeUnit | 0.68 |
| AEStopDate | 0.66 |
| MedicalHistoryStartDate | 0.66 |
| ReporterCausalityNotSuspected | 0.65 |
| ReporterCausalityPossiblyRelated | 0.65 |
| SubjectNumber | 0.65 |
| AEOnsetDate | 0.63 |
| ReporterSeriousnessDeath | 0.60 |
| ActionTaken | 0.58 |
| Height | 0.57 |
| ReportReceiptDate | 0.57 |
| ReporterLastName | 0.55 |
| PageNumber | 0.55 |
| ReporterCausalityProbablyRelated | 0.55 |
| ReporterCausalityRelated | 0.54 |
| DoseUnit | 0.54 |
| ReporterSeriournessNonSerious | 0.54 |
| TreatmentArm | 0.54 |
| ReporterCountry | 0.53 |
| Dechallenge | 0.53 |
| TreatmentPhase | 0.52 |
| ExpirationDate | 0.50 |

Labels 204 can correspond with 109 PV entities. The $F_1$ score indicates a level of accuracy at which the fully trained learning model 210 can identify the given entity. The $F_1$ score will be described in greater detail below.

Training application 112 may transmit training data 200, labels (e.g., metadata) 204 corresponding to training data 200, and parameters to learning engine 102 for training learning model 104. Learning engine 102 may receive training data 200 and labels 204. In a non-limiting example implementation, training data 200 included 20,000 machine-readable ICSRs. These ICSRs were received by Celgene drug safety over a 2-year period (January 2015-December 2016). Further details regarding the characteristics and sampling of ICSRs have been previously published (Abatemarco et al., 2018; Mockute et al., 2019). For hyperparameters, the best practice values available were used by spaCy.

Learning model 104 may generate word embeddings (or bloom embeddings) for each of the documents in training data 200. Learning model 104 may tokenize the word embeddings (or bloom embeddings) for each document of training data 200. More specifically, learning model 104 may tokenize each document into segments of words, letters, punctuation, or the like. Tokenization segments each document based on rules that are specific to a language and specific domain. Moreover, learning model 104 may use the statistical model to segment each document.

Learning model 104 may implement a CNN algorithm to break down each segment into a set of features and generate a vector (e.g., one-dimensional vector) corresponding to each of the segments using the set of features of each respective segment.

Learning model 104 may apply weights assigned to each feature of the set of features to the vector to generate a resultant vector. The weights may be included in the parameters received from training application 112. Learning model 104 may assign a part-of-speech tag to the words in the segment corresponding to the vector, based on the resultant vector and the statistical NER model.

Learning model 104 may also assign dependency tags to the words in each segment of each respective document based on the resultant vector corresponding to each segment, the statistical NER model, and the part-of-speech tag assigned to the words in each segment.

Learning model 104 may assign a NER label to the words in each segment of each respective document based on the resultant vector corresponding to each segment, the statistical NER model, and the part-of-speech and dependency tags assigned to the respective words in each segment. The NER label may be selected from a predefined set of labels corresponding to the domain. The NER label indicates that the word corresponds with a field or entity of the domain. For example, NER labels may be assigned to words or phrases critical to PV events detection to classify the documents accurately.

Learning model 104 may validate NER labels assigned the words of each document based on the respective labels 204 corresponding to each document. Based on the validation results and a gradient 208, learning model 104 may modify the weights assigned to each feature, tokenize the word (or bloom) embeddings for each document to generate new segments for each document, generate a new vector based on the new segments and new weights, assign a parts-of-speech tag to the words of the new segments based on the new vector, assign a dependency tag to the words of the new segments based on the parts-of-speech tag assigned to the words and the new vector, assign a NER label to the words of the new segments based on the parts-of-speech and dependency tags assigned to the words, and the new vector, and validate the NER labels based on the labels 204. Learning model 104 may recursively modify the weights and perform these steps until learning model 104 assigns NER labels at a desired accuracy. Gradient 208 may be a gradient loss function, which is configured to optimize the weights to train learning model 104.

In a non-limiting example implementation, based on using 20,000 annotated ICSR documents to train learning model 104, a threshold $F_1$ score of 75% was used to determine whether learning model 104 was fully trained. The following equation was used to generate the $F_1$ score:

Precision=True Positives/(True Positives+False Positives)

Recall=True Positives/(True Positives+False Negatives)

$F1 = 2 \times (Precision \times Recall)/(Precision+Recall)$

Once learning model 104 is assigning NER labels at a desired accuracy, the learning model 104 may be a fully trained learning model 210. Client device 110 may receive a request to classify an ICSR document using fully trained learning model 210. The request may include the ICSR document. Classification application 114 may transmit the ICSR document and parameters to fully trained learning model 210. Fully trained learning model 210 may generate a word (bloom) embedding for the ICSR document. Fully trained learning model 210 may tokenize the word embedding to generate segments for the document, generate a vector based on the segments and weights included in the parameters, assign a parts-of-speech tag to the words of the segments based on the statistical NER model and vector, assign a dependency tag to the words of the segments based on the parts-of-speech tag assigned to the words, the statistical NER model, and the vector, assign a NER label to the words of the segments based on the parts-of-speech and dependency tags assigned to the words, the statistical NER model, and the vector. Fully trained learning model 210 may generate output 212 in response to assigning the NER labels.

Output 212 may include NER labels for critical words or phrases necessary to classify the ICSR document. For example, output 212 may include a NER label for the word "admitted," as "ReportersSeriousHospitalization," and the word "Melanoma" may include a NER label as AE10053571.

Fully trained learning model 210 may classify the ICSR document based on the NER labels. For example, fully trained learning model 210 can classify ICSR documents for case validity, seriousness, fatality, and causality, identify adverse effects present in the structured product labels (SPLs) for FDA-approved drugs expectedness, and identify potential off-label product usage.

Fully trained learning model 210 may generate output including uncovered entities, along with any detected relationships between product indication(s) and associated AEs. As an example, Streamlit can be used to generate a web interface to render the output. Fully trained learning model 210 may cause display of the output on client device 110.

In some embodiments, fully trained learning model 210 may extract the words and phrases from the ICSR document and their respective NER labels. Fully trained learning model 210 may use the extracted words and phrases and their respective NER labels from the ICSR document, along with extracted words and phrases and their respective NER labels from other documents (ICSR or otherwise), to build a knowledge base. The knowledge base may be related to a drug, drug type, disease, patient demographic, etc.

The knowledge base may be a graph-based structure including nodes connected using edges. The nodes may contain the extracted words and phrases and their respective NER labels. Fully trained learning model 210 may connect the nodes using an edge based on identifying a relationship between the nodes. Fully trained learning model 210 may determine the relationship between the nodes storing words or phrases based on the NER label of the respective words or phrases. The knowledge base may be stored in database 120.

The knowledge base may be used across different industries to determine different aspects about a drug, drug type, disease, patient demographic, etc. The industries may include technology, regulatory, medical, etc. For example, a regulatory industry such as the FDA can use the knowledge base to identify various effects of a drug. In another example, a manufacturer of a drug may use the knowledge base to identify ingredients of a drug that are causing adverse effects. In yet another example, medical professionals or researchers may use the knowledge base to identify drugs or therapies for diseases.

Figure 3:
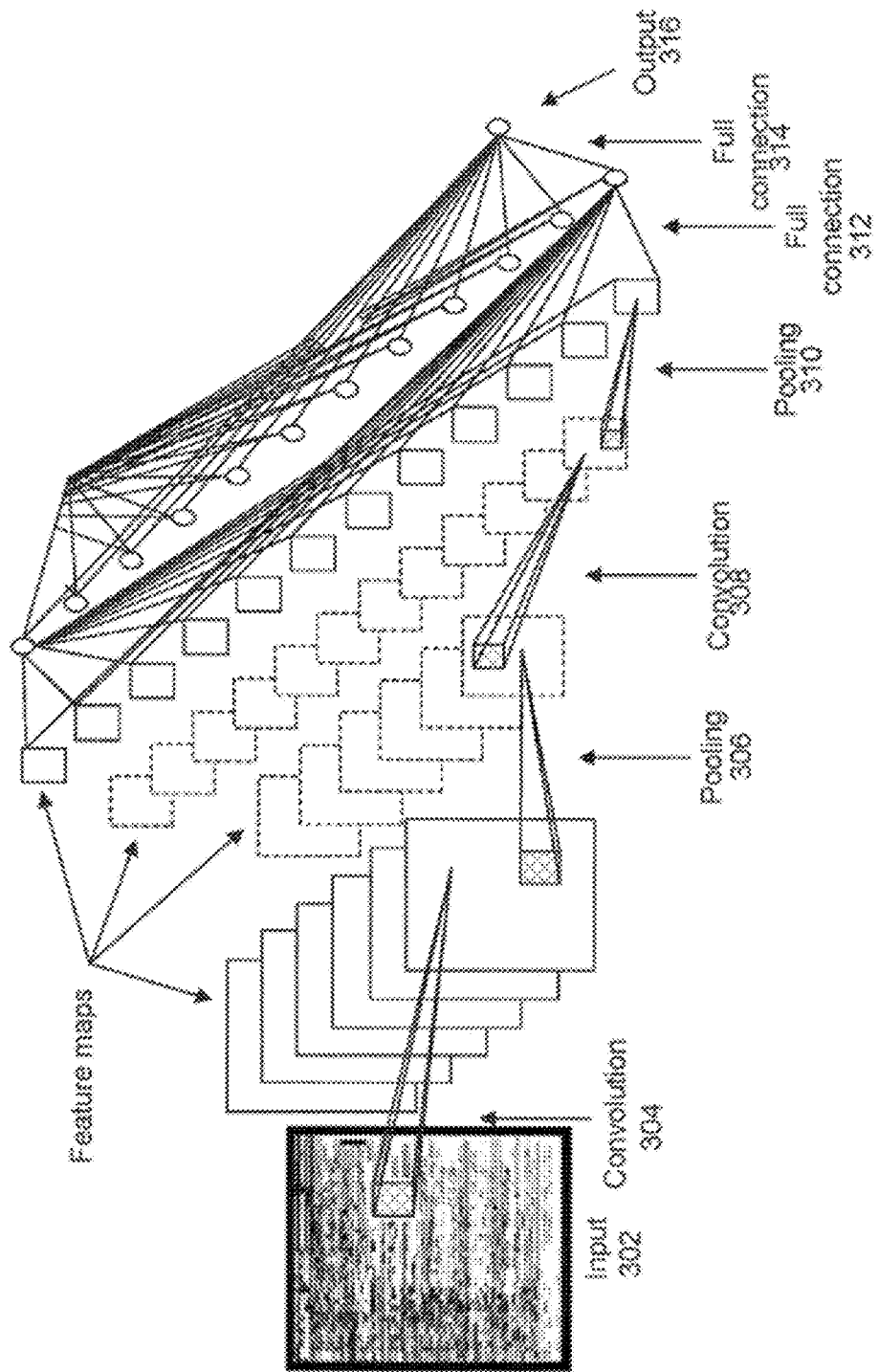
FIG. 3 is a block diagram of an example of a learning model implementing a CNN algorithm, according to example embodiments.

FIG. 3 is a block diagram of an example of a learning model implementing a CNN algorithm, according to example embodiments. FIG. 3 will be described in reference to FIGS. 1-2.

As described above, learning model 104 may implement a supervised deep-learning algorithm such as CNN to classify documents based on their corresponding image files. CNN algorithm 300 may be used to generate a vector representing each tokenized segment of a document, such that the vector can be used to assign a parts-of-speech tag, dependency tag, and NER label.

CNN algorithm 300 may be trained in two phases, a forward phase, and a backward phase. The forward phase includes convolution layers 304 and 308, pooling layers 306 and 310, and fully connected layers 312 and 314. Convolution layers 304 and 308 may apply filters to input segment 302 to generate a feature map. Pooling layers 306 and 310 may generate a reduced feature map. Fully connected layers 312 and 314 may then classify the features of the image using weights and biases to generate output 316. Output 316 may be the assigned part-of-speech tag, dependency tag, and NER label. The values of the filters, weights, and biases may be parameters received by CNN algorithm 300 (e.g., from client device 110).

In the backward phase, CNN algorithm 300 may use backpropagation to determine whether the CNN algorithm could correctly assign the parts-of-speech tag, dependency tag, and NER label. The CNN algorithm may update the values for the filters, weights, and biases using a gradient descent algorithm and re-execute the forward phase on input segment 302.

As an example, CNN algorithm 300 may be trained using tokenized segments of word embeddings of documents, including input segment 302. Input segment 302 may correspond to one or more words in the document. As a non-limiting example, input segment 302 may have a size of 160×160 pixels, making it a 160×160 dimensioned array. The 160×160 dimensioned array may be flattened into a 25600-dimensional vector. Each component of the vector may include a value between 0 and 1. The value may describe the intensity of the pixel. Input segment 302 may include a unique JPEG "fingerprint" in grayscale format.

In convolution layer 304, CNN algorithm 300 may execute feature extraction on input segment 302. The features may include portions of input segment 302. For example, the features may be different edges or shapes of input segment 302. CNN algorithm may extract different types of features to generate different types of feature maps. For example, CNN algorithm 300 may apply an array of numbers (e.g., kernel) across the different portions of input segment 302. The kernel may also be referred to as a filter. Different types of filters may be applied to input segment 302 to generate different feature maps, as indicated above. For example, the filter for identifying a shape in input segment 302 may differ from the filter for edge detection. Therefore, different kernels may be applied to identify a shape in input segment 302 compared to edge detection. Each kernel may include a different array of numbers. The filters or kernels' values may be randomly assigned and optimized over time (e.g., using a gradient descent algorithm). The kernel may be applied as a sliding window across different portions of input segment 302. The kernel may be summed with a given portion of input segment 302 to generate an output value. The output value may be included in a feature map. The feature maps may include an output value from the different kernels applied to each portion of input segment 302. The generated feature maps may be a two-dimensional array.

In pooling layer 306, CNN algorithm 300 may reduce each feature map's dimensionality generated in convolution layer 304. In particular, CNN algorithm 300 may extract portions of a given feature map and discard the rest. Pooling the image keeps the important features. For example, a feature map may include activated areas and non-activated areas. Activated areas may include detected features, while non-activated areas may indicate that the segment's portion did not include a feature. Pooling may remove the non-activated areas. This way, the size of the image is reduced. CNN algorithm 300 may use max or average pooling in the pooling layer to perform these operations. Max pooling keeps the higher values of portions of the feature map while discarding the remaining values. Average pooling keeps the average value of different portions of the feature map. Therefore, CNN algorithm 300 may generate a reduced feature map for each of the feature maps generated in convolution layer 304.

In convolution layer 308, CNN algorithm 300 may generate additional feature maps based on the reduced feature maps generated in pooling layer 306. Furthermore, in pooling layer 310, CNN algorithm 300 may generate further reduced feature maps based on the feature maps generated in convolution layer 308. Multiple different convolution layers and pooling layers may be added to CNN algorithm 300.

Convolution layers 304 and 308 may also apply a Rectified Linear Unit (ReLU) function to input segment 302. The ReLU function is applied to input segment 302 to remove the linearity from input segment 302. For example, the ReLU function may remove all the black elements from input segment 302 and keep only the grey and white colors. This causes the color to change more abruptly in input segment 302, which removes the linearity from input segment 302.

Convolution layers 304 and 308 and pooling layers 306 and 310 may be used for feature learning. Feature learning allows CNN algorithm 300 to identify desired features in input segment 302 and, therefore, accurately classify input segment 302. Therefore, by optimizing convolution layers 304 and 308 and pooling layers 306 and 310, CNN algorithm 300 may apply the correct filters on input segment 302 to extract the necessary features needed to classify input segment 302.

In fully connected layer 312, CNN algorithm 300 may flatten the reduced feature maps generated in pooling layer 310 into a one-dimensional array (or vector). The fully connected layer is a neural network. CNN algorithm 300 may execute a linear transformation on the one-dimensional array in fully connected layer 312. CNN algorithm 300 may perform the linear transformation by applying weights and biases to the one-dimensional array to generate fully connected layer 314. Initially, the weights and biases are randomly initialized and may be optimized over time.

In fully connected layer 314, CNN algorithm 300 may perform a non-linear transformation such as an activation layer function (e.g., softmax or sigmoid) to assign the parts-of-speech tag, dependency tag, and NER label to respective words of input segment 302.

CNN algorithm 300 may use backpropagation to validate its classification of input segment 302. As described in FIG. 2, in a training mode, CNN algorithm 300 may receive the document and metadata of the corresponding document. The metadata may include labels 204 assigned to different words or phrases of a document. CNN algorithm 300 may compare NER labels assigned to words or phrases of a document with the labels 204 corresponding to the document. If the NER labels assigned to the document by CNN algorithm 300 match the labels 204 corresponding to the document, CNN algorithm 300 may determine that the NER labels were correctly assigned. Alternatively, if the classification assigned to the document by CNN algorithm 300 does not match the classification included in the document's metadata, the CNN algorithm 300 may determine that the NER labels were incorrectly assigned. In some embodiments, the part-of-speech tags and dependency tags may also be validated.

Backpropagation may also include optimizing the input parameters, such that the parts-of-speech and dependency tags and NER labels are more accurately assigned to the words or phrases of the document. The input parameters may include values for the kernels, weights, biases, or the like. Gradient descent (e.g., gradient 208) may be used to optimize the parameters.

Gradient descent is an iterative process to optimize CNN algorithm 300. Gradient descent may update the parameters of CNN algorithm 300 and cause learning model 104 to assign the parts-of-speech and dependency tags and the NER labels to the words or phrases of each document and validate the parts-of-speech and dependency tags and the NER labels. After each iteration of executing CNN algorithm 300, the parameters may be further updated (or optimized). Each iteration of CNN algorithm 300 may be referred to as an epoch. CNN algorithm 300 may execute a predetermined number of epochs to be considered completely trained. The predetermined number of epochs may be selected based on the desired accuracy of assigning the parts-of-speech and dependency tags and the NER labels.

As a non-limiting example, CNN algorithm 300 may be implemented by learning model 104 to classify ICSR documents. Learning model 104 may use CNN algorithm 300 to recognize words or phrases in an ICSR document such that learning model 104 may determine case validity, seriousness, fatality, and causality, identify present in the structured product labels (SPLs) for FDA-approved drugs for expectedness, and identify potential off-label product usage.

As indicated above, CNN algorithm 300 may execute a predetermined number of epochs to be considered completely trained. A user (e.g., developer) can determine that the CNN algorithm is completely trained based on an F-1 score and an Area Under the Curve (AUC) score of CNN algorithm 300. The F-1 score and Area Under the Curve (AUC) curve may indicate the accuracy of assigning the parts-of-speech and dependency tags and the NER labels to the words or phrases of the respective document.

Figure 4:
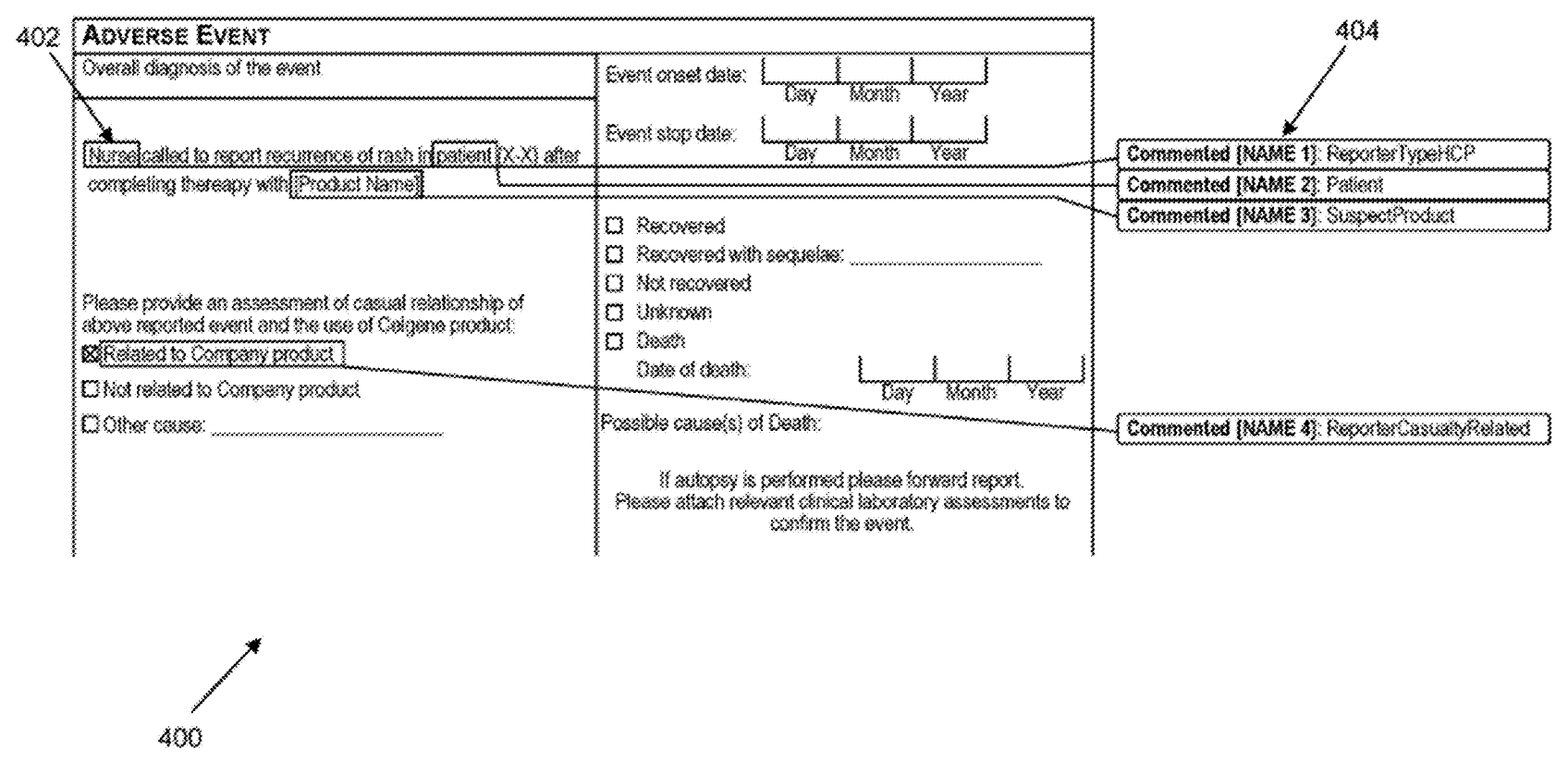

FIG. 4 illustrates an example document used for training the learning model, according to an example embodiment. Document 400 may be an ICSR document and can include critical words or phrases 402 needed to classify the ICSR document. Document 400 may be used to train a learning model (e.g., learning model 104, as shown in FIG. 1) to classify ICSR documents. Document 400 may include annotations 404 (e.g., labels 204, as shown in FIG. 2). Annotations 404 may be a label assigned to critical words or phrase 402 needed to classify the ICSR document. For example, the word "Name" may be assigned a label "ReporterTypeHCP." Annotations 204 may be used to validate the results of assigning NER labels to document 400.

Figure 5:
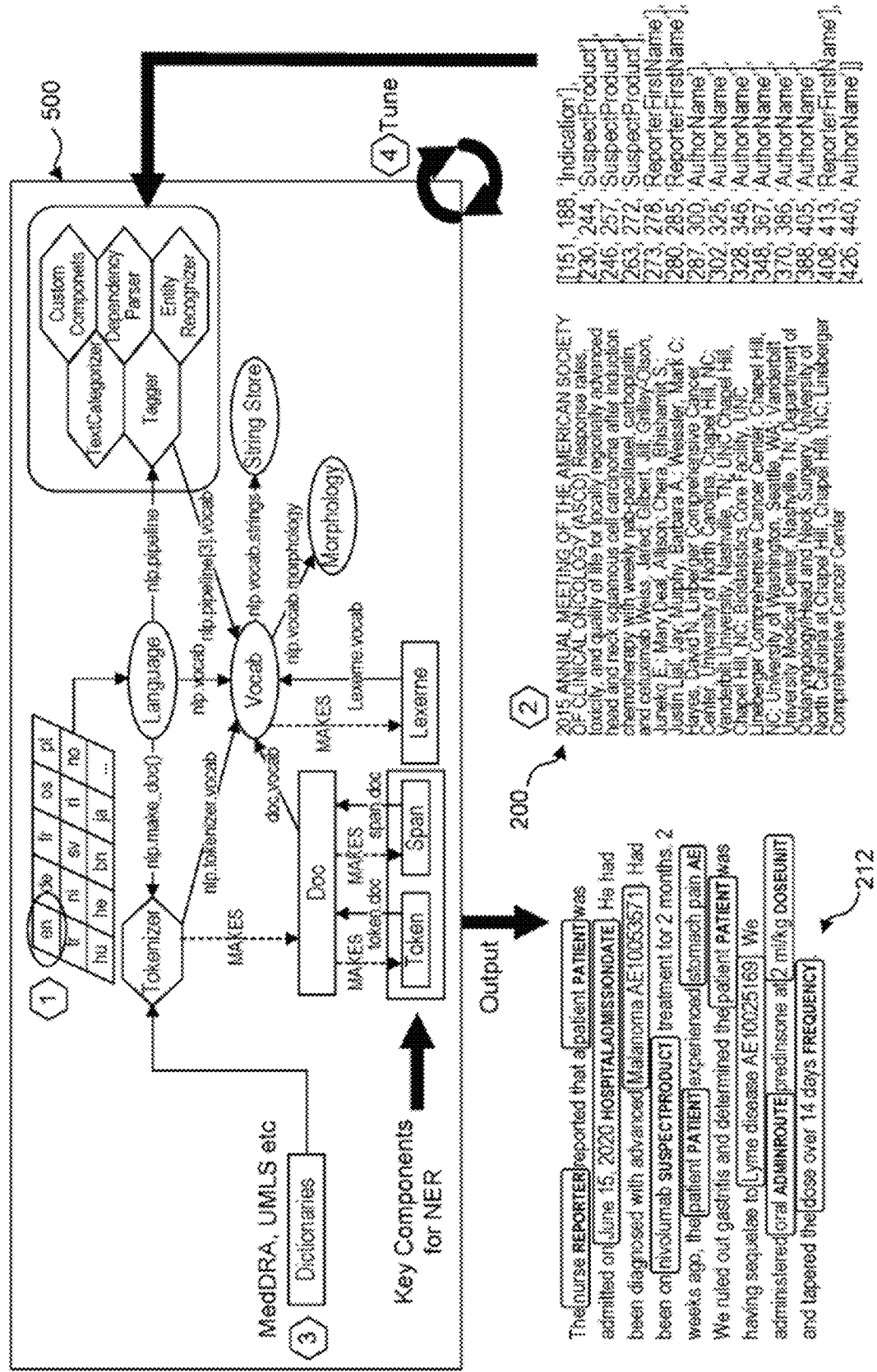
FIG. 5 is a block diagram illustrating a model design framework of the learning model, according to an example embodiment.

FIG. 5 is a block diagram illustrating a model design framework of the learning model, according to an example embodiment. Model design framework 500 may be implemented by a learning model (e.g., learning model 104 or fully trained learning model 210). Model design framework 500 may be used to train the learning model using training data 200. Dictionaries or ontologies may be loaded onto model design framework 500. For example, the dictionaries or ontologies may be MedRNA or UMLS.

Once the learning model is trained, as described above, model design framework 500 may build a vocabulary using custom statistical NER models and existing language statistical models. Model design framework 500 may receive documents for classification. Model design framework 500 may tokenize the document and implement a CNN algorithm to recognize the document's words or phrases using a vocabulary. Model design framework 500 may assign parts-of-speech and dependency tags to words or phrases in the document and assign NER labels to the document's words or phrases. Model design framework 500 may generate output 212, including the NER labels to words or phrases of the document necessary to classify the document. Model design framework 500 may be able to understand the context of the documents when assigning the NER labels. For example, even though gastritis is included in the text of output 212, the full phrase reads, "We ruled out gastritis . . . ." This indicates that gastritis does not need to be labeled as it is not important in classifying the document.

Figure 6:
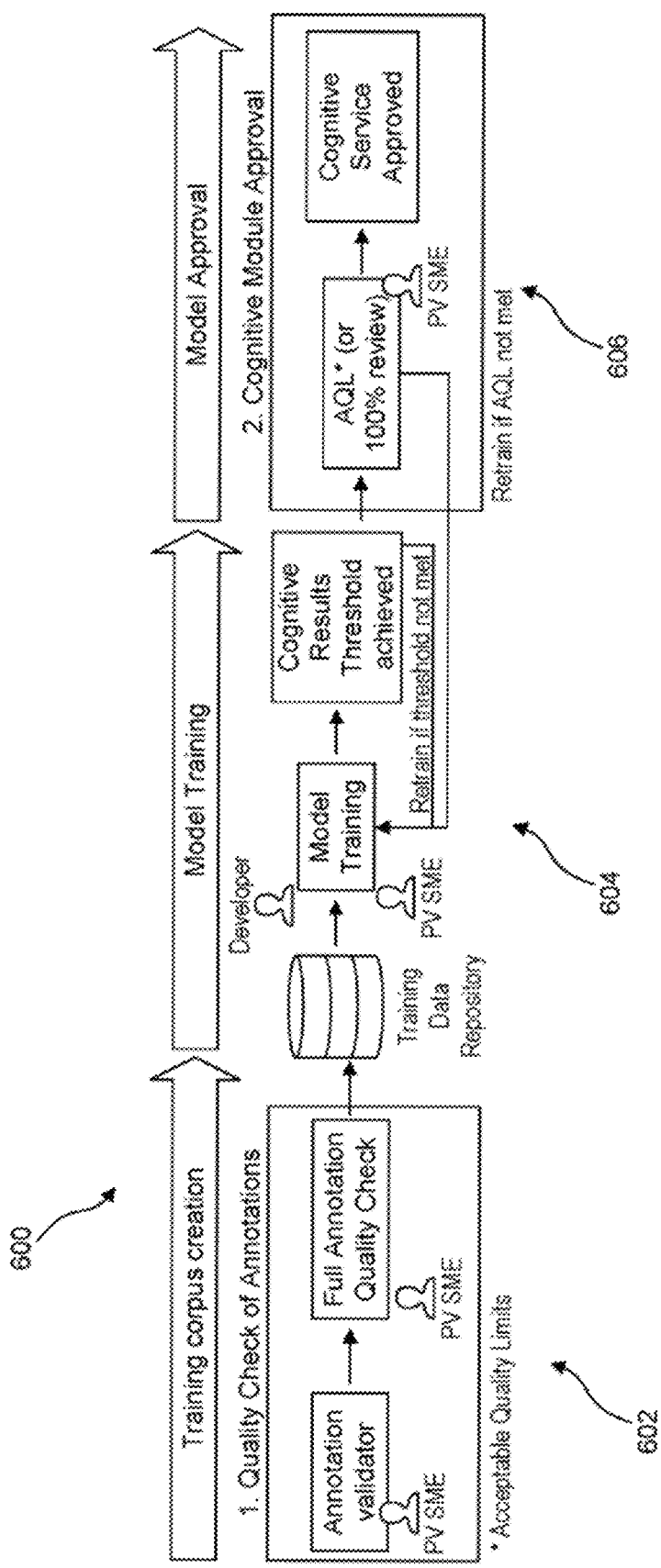
FIG. 6 is a block diagram of a model approval flow, according to example embodiments.

FIG. 6 is a block diagram of a model approval flow, according to an example embodiment. Model approval flow 600 may be used to determine whether a learning model assigns parts-of-speech and dependency tags and NER labels at an acceptable level of accuracy. In operation 602, a training corpus (e.g., training data) may be created. More specifically, a Subject Matter Expert (SME) may annotate a document with labels assigned to words or phrases of a document necessary to classify the document. The SME may perform a quality check of the annotations. The annotated document may be part of the training corpus, and the training corpus can be stored in a training data repository (e.g., database 120, as shown in FIG. 1).

In operation 604, a learning model (e.g., learning model 104, as shown in FIG. 1) can be trained using the training corpus stored in the training data repository. A developer or SME may transmit the request to train the learning using the training corpus. The learning model may be trained using the training corpus as described above. Based on the validation of the assigned parts-of-speech and dependency tags and NER labels, the learning model may determine whether the accuracy of the learning model's assignment of the assigned parts-of-speech and dependency tags and NER labels meets a threshold. The threshold may be preprogrammed or may be provided in the request to train the learning model. If the accuracy of the learning model's threshold is not met, a request may be transmitted to retrain the learning model with the same set of documents or a different set of documents.

If the accuracy of the learning model's classification meets the threshold, model approval flow 600 may proceed to operation 606. In operation 606, an SME may manually confirm the learning model's assignment of the assigned parts-of-speech and dependency tags and NER labels. In some embodiments, the SME may validate the classifications of the same subset of documents as the learning model. Alternatively, the SME may validate the classifications of a different subset of documents. The subset of documents may be 10% of the set of documents.

The SME may confirm whether the learning model, based on the document's metadata, accurately classified each document of the subset of documents. Furthermore, the SME may also confirm whether the metadata is accurate. In response to validating the learning model's assignment of the assigned parts-of-speech and dependency tags, and NER labels of the subset of documents, the SME may determine whether an Acceptable Quality Limit (AQL) has been achieved. The AQL may be a value associated with a desired accuracy level of the learning model. In some embodiments, the AQL may be the same as the threshold. In other embodiments, the AQL may be different from the threshold. If the SME determines that the AQL has not been met, a request may be transmitted to retrain the learning model. In response to the SME determining that the AQL has been met, the SME may approve the learning model. The learning model may be considered fully trained and ready to classify documents.

Figure 7:
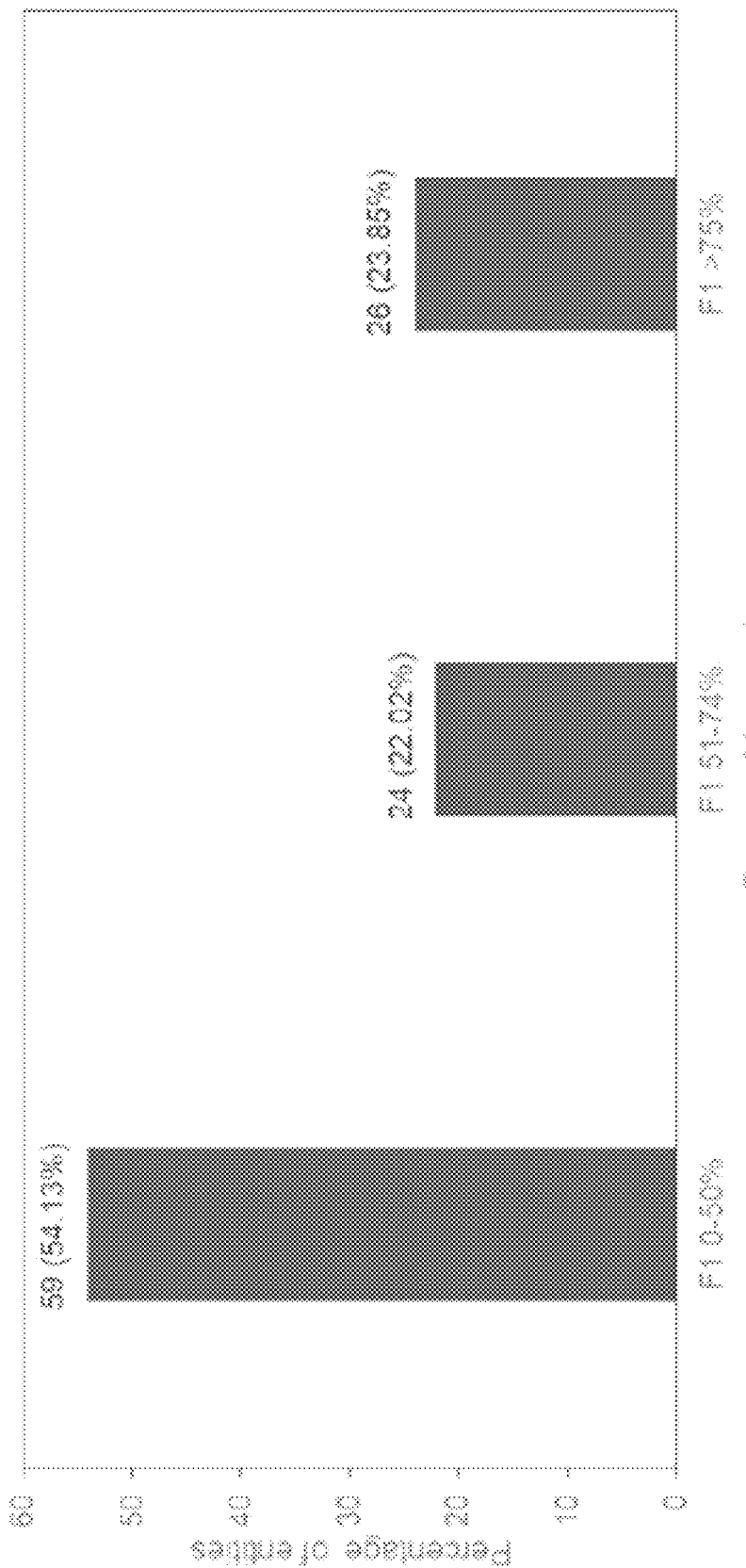
FIG. 7 is a graph that illustrates $F_1$ scores in recognizing entities (e.g., words or phrases) in documents using a trained learning model, according to an example embodiment.

FIG. 7 is a graph that illustrates $F_1$ scores in recognizing entities (e.g., words or phrases) in documents using a trained learning model, according to an example embodiment. Graph 700 indicates that a trained learning model (e.g., fully trained learning model 210 as shown in FIG. 2) may accurately identify 54.13% of 109 entities with an $F_1$ score of 0-50% accuracy. Moreover, the trained learning model may accurately identify 22.02% of 109 entities with an $F_1$ score of 51-74% accuracy. Furthermore, the trained learning model may accurately identify 23.85% of 109 entities with an $F_1$ score of greater than 75% accuracy.

Figure 8:
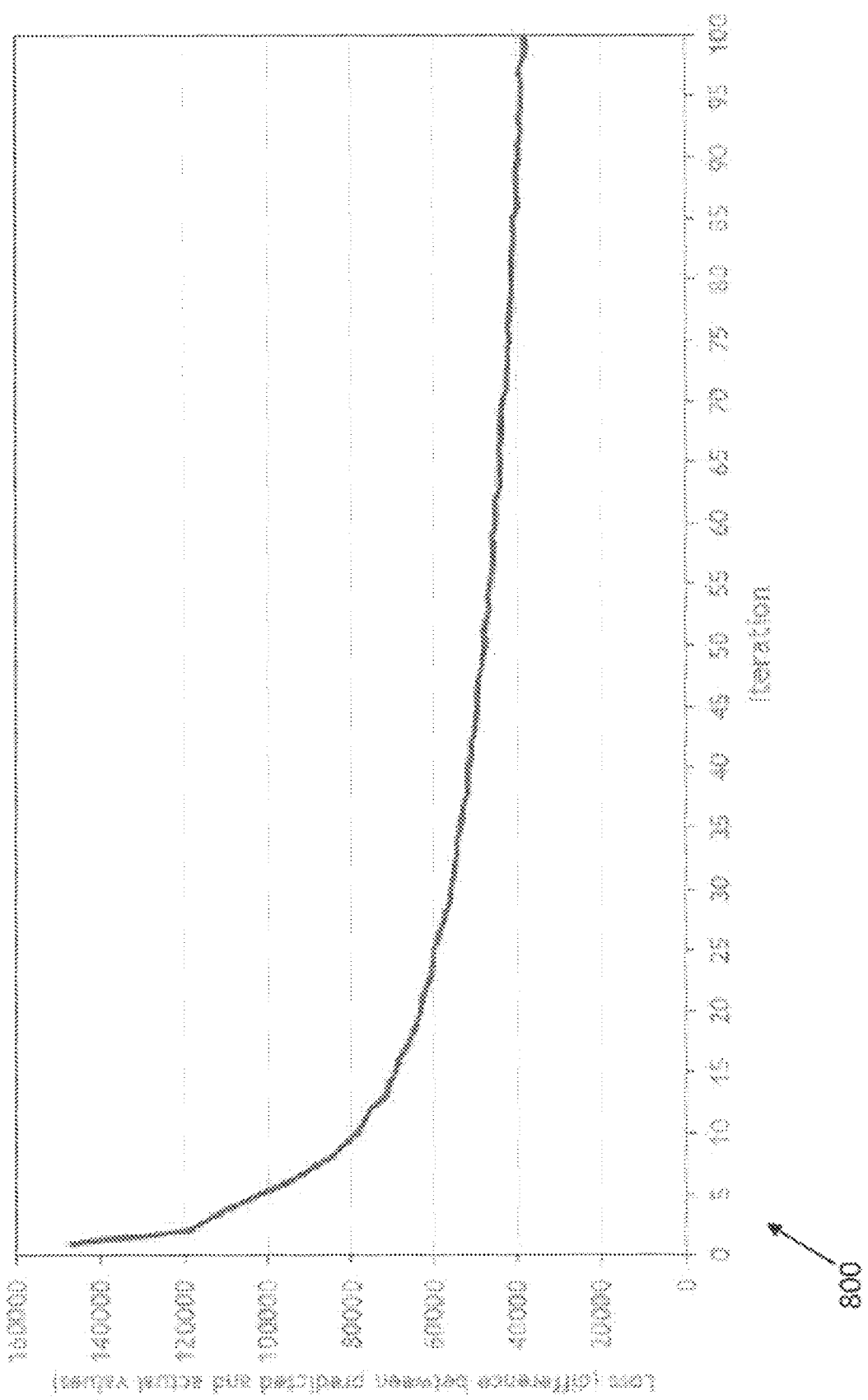
FIG. 8 is a graph illustrating a loss function for the learning model, according to an example embodiment.

FIG. 8 is a graph 800 illustrating a loss function for the learning model, according to an example embodiment. The y-axis of graph 800 represents the difference between predicted values and actual values; the x-axis represents the number of iterations the learning model (e.g., learning model 104) has been trained. Each iteration can be referred to be an epoch. Graph 800 may illustrate 100 epochs across the x-axis. Graph 800 illustrates that, as the number of iterations of training the learning model increases, the difference between the predicted values and actual values decreases. As such, the error between predicted and labeled entities was minimized over 100 epochs. The loss function in graph 800 illustrates a smooth decrease in loss, resulting in a loss decrease of about 74% over the course of training.

FIG. 9 illustrates a fully trained learning model summarizing a document, according to an example embodiment. The in-house summarizer implements the fully trained learning model described herein (e.g., learning model 104 or fully trained learning model 210). The NLTK implements a conventional NLP model. The NLTK summarizer can generate summary 902 of document 900, and the in-house summarizer can generate summary 904 of document 900. As shown by summary 904, the in-house summarizer provides a broader coverage of document 900 in summary 904 as compared to summary 902. The NLTK summarizer concentrates on a limited portion of document 900 when generating summary 902. As such, the in-house summarizer, implementing the fully trained learning model described herein, provides an advantage over conventional summarizers implementing conventional NLP models by providing broader coverage of a document when generating a summary.

Figure 10:
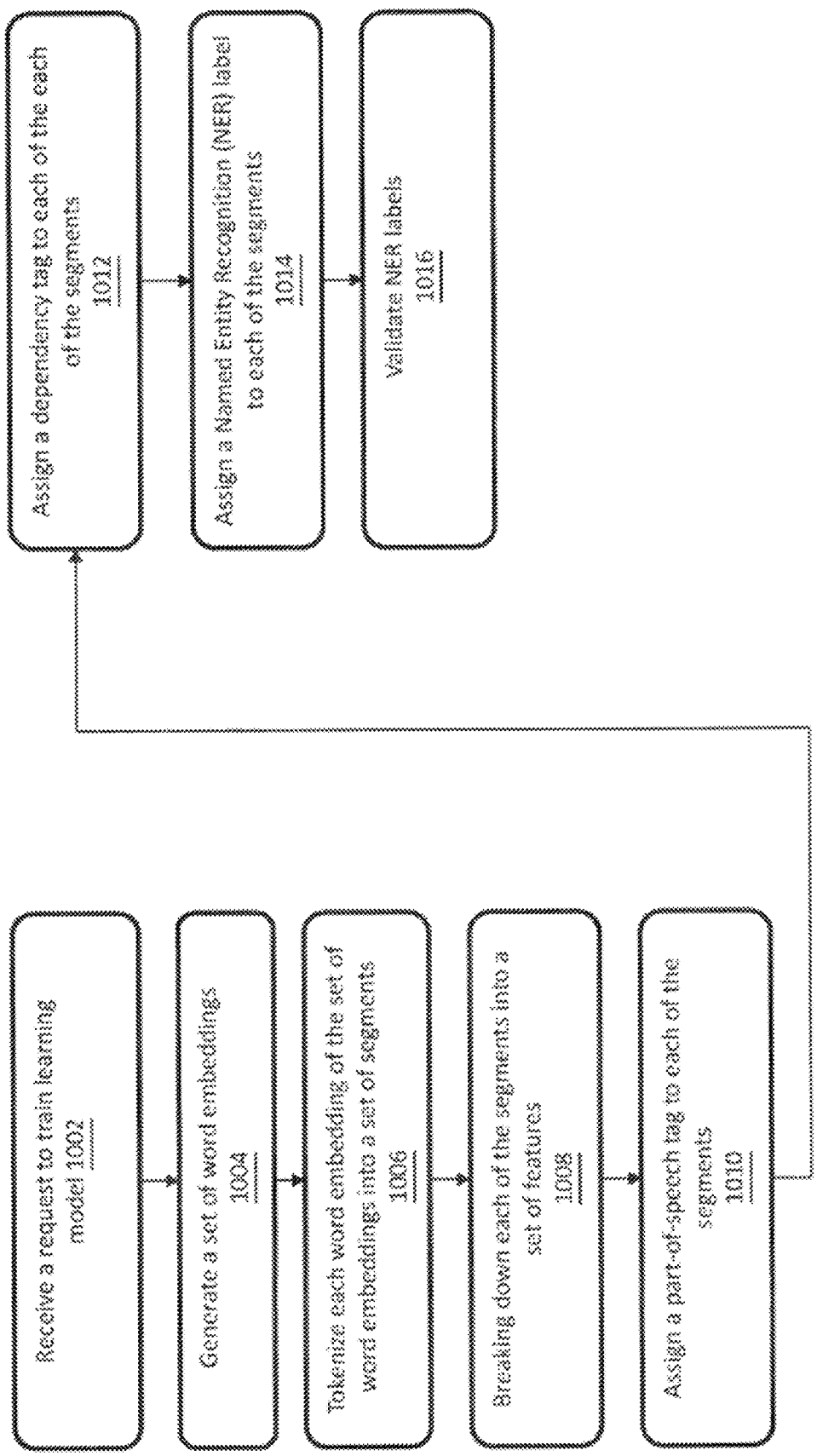
FIG. 10 is a flowchart illustrating a process for training, according to example embodiments.

FIG. 10 is a flowchart illustrating the process for training a learning model according to an embodiment. Method 1000 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 10, as will be understood by a person of ordinary skill in the art.

Method 1000 shall be described with reference to FIG. 1. However, method 1000 is not limited to that example embodiment.

In operation 1002, a learning engine 102 receives a request to train learning model 104 to classify documents of a domain. The request includes a set of documents and metadata for each of the documents. The metadata may be annotations labeling certain words or phrases in each document. Learning model 104 may be a NLP framework that uses CNN and BiLSTM.

In operation 1004, learning model 104 generates a set of word embeddings for each document of the set of documents. The word embeddings may be vector representations of the words of each of the documents. Words may be positioned in a vector space. Words may be positioned in proximity to other words that are closer in context and semantics. The word embeddings may include words from each respective document. The word embeddings may be bloom embeddings.

In operation 1006, learning model 104 tokenizes each word embedding in a set of word embeddings into a set of segments. Each segment includes a word from the word embedding. Learning model 104 may use a statistical NER model and general language rules to segment the words from the word embedding.

In operation 1008, learning model 104 is trained to classify each document of the set of documents of the domain by breaking down each of the segments of the set of segments of each document of the set of documents into a set of features. A CNN algorithm may be used to generate the set of features.

In operation 1010, learning model 104 assigns a part-of-speech tag to each of the set of segments for each document of the set of documents, based on predetermined weights assigned to each feature of the set of features of a corresponding segment. A part-of-speech tag defines whether a word is a noun, verb, adjective, etc.

In operation 1012, learning model 104 assigns a dependency tag to each of the segments of the set of segments of each document of the set of documents, based on the part-of-speech tag assigned to the corresponding segment and the predetermined weights assigned to each feature of the set of features of the corresponding string. The dependency tag indicates a word's relationship with other words in the document. For example, the phrase "lazy dog" indicates that the word "lazy" modifies the noun "dog."

In operation 1014, learning model 104 assigns a Named Entity Recognition (NER) label, from a set of predefined labels corresponding to the domain, to each of the segments of the set of segments of each document of the set of documents, based on the part-of-speech tag and dependency tag assigned to the corresponding segment, and the predetermined weights assigned to each feature of the set of features of the corresponding segment. Learning model 104 may generate an output that includes the NER tags alongside each respective word. Learning model 104 may generate NER tags for words necessary to classify the documents.

In operation 1016, learning model 104 validates the assigned NER labels by comparing the metadata for each document to the respective document's assigned NER labels. Operations 1008-1016 may be executed recursively to train the learning model. For each iteration of training, the weights assigned to the features may be optimized based on a gradient loss function.

Figure 11:
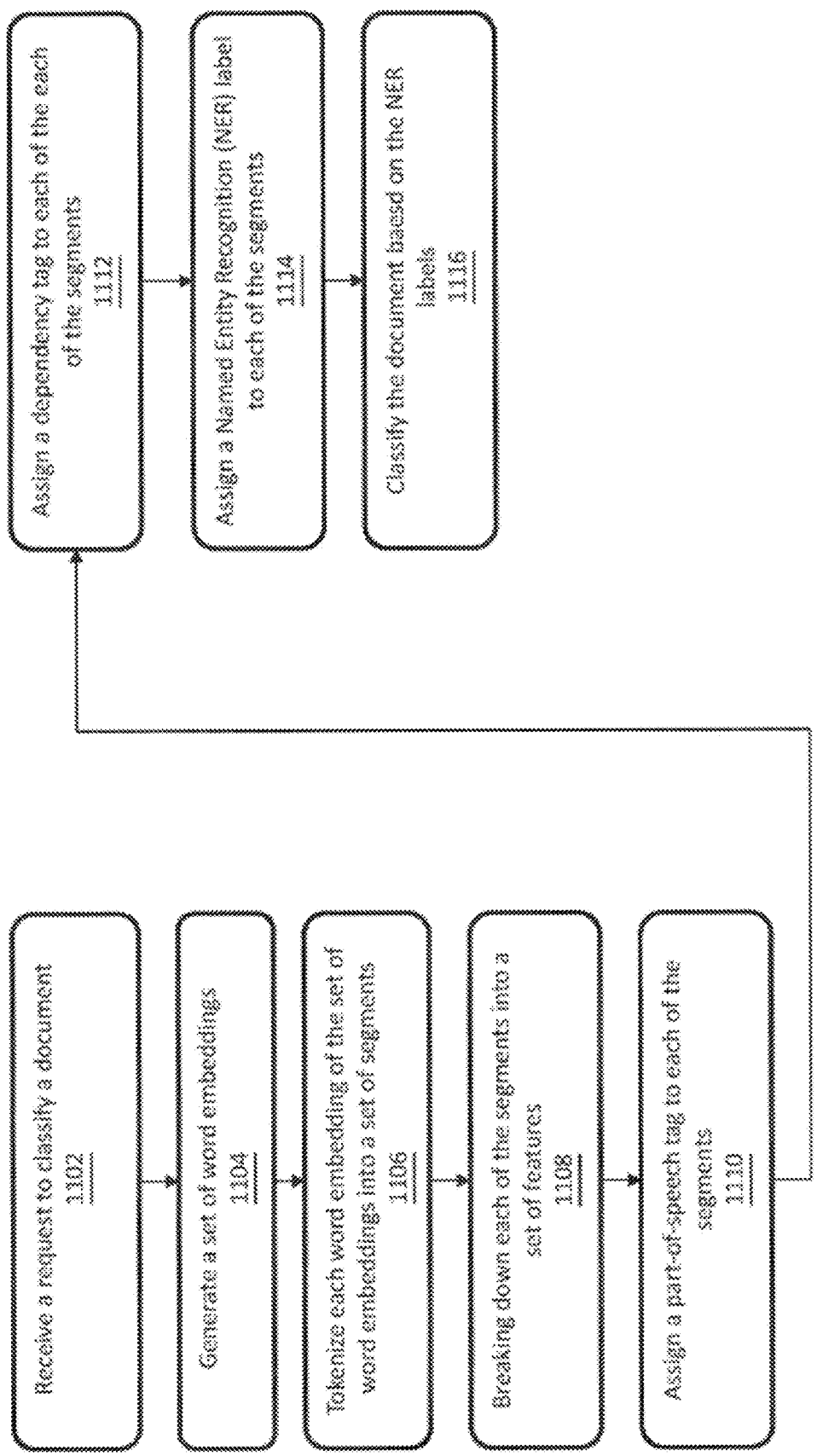
FIG. 11 is a flowchart illustrating a process for classifying a document using a trained learning model, according to example embodiments.

FIG. 11 is a flowchart illustrating the process for classifying documents using a trained learning model, according to an embodiment. Method 1100 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 11, as will be understood by a person of ordinary skill in the art.

Method 1100 shall be described with reference to FIG. 1. However, method 1100 is not limited to that example embodiment.

In operation 1102, a learning engine 102 receives a request to classify a new document using a trained learning model. The trained learning model may be configured to classify documents corresponding to the domain of the document. The trained learning model may implement an NLP framework that uses CNN and BiLSTM. Learning model 104 may be a fully trained learning model.

In operation 1104, learning model 104 generates a word embedding for the document. The word embeddings may include words from the document. The word embedding may be a bloom embedding.

In operation 1106, learning model 104 tokenizes the word embedding into a set of segments. Each segment includes a word from the word embedding. Learning model 104 may use a statistical NER model and general language rules to segment the words from the word embedding.

In operation 1108, learning model 104 breaks down each of the segments of the set of segments of the document into a set of features. A CNN algorithm may be used to generate the set of features.

In operation 1110, learning model 104 assigns a part-of-speech tag to each of the segments of the set of segments, based on predetermined weights assigned to each feature of the set of features of a corresponding segment. A part-of-speech tag defines whether a word is a noun, verb, adjective, etc.

In operation 1112, learning model 104 assigns a dependency tag to each of the segments of the set of segments, based on the part-of-speech tag assigned to the corresponding segment and the predetermined weights assigned to each feature of the set of features of the corresponding string. The dependency tag indicates a word's relationship with other words in the document.

In operation 1114, learning model 104 assigns a Named Entity Recognition (NER) label from a set of predefined labels corresponding to the domain, to each of the segments of the set of segments, based on the part-of-speech tag and dependency tag assigned to the corresponding segment, and the predetermined weights assigned to each feature of the set of features of the corresponding segment. Learning model 104 may generate an output that includes the NER tags alongside each respective word. Learning model 104 may generate NER tags for words necessary to classify the document.

In operation 1116, learning model 104 classifies the new document corresponding to the domain based on the assigned NER labels, using the trained learning model. In one example, the learning model is configured to classify pharmacovigilance documents based on case validity, seriousness, fatality, and causality. The learning model may be further configured to identify adverse effects in the structured product labels (SPLs) for FDA-approved drugs for expectedness and identify potential off-label product usage.

Figure 12:
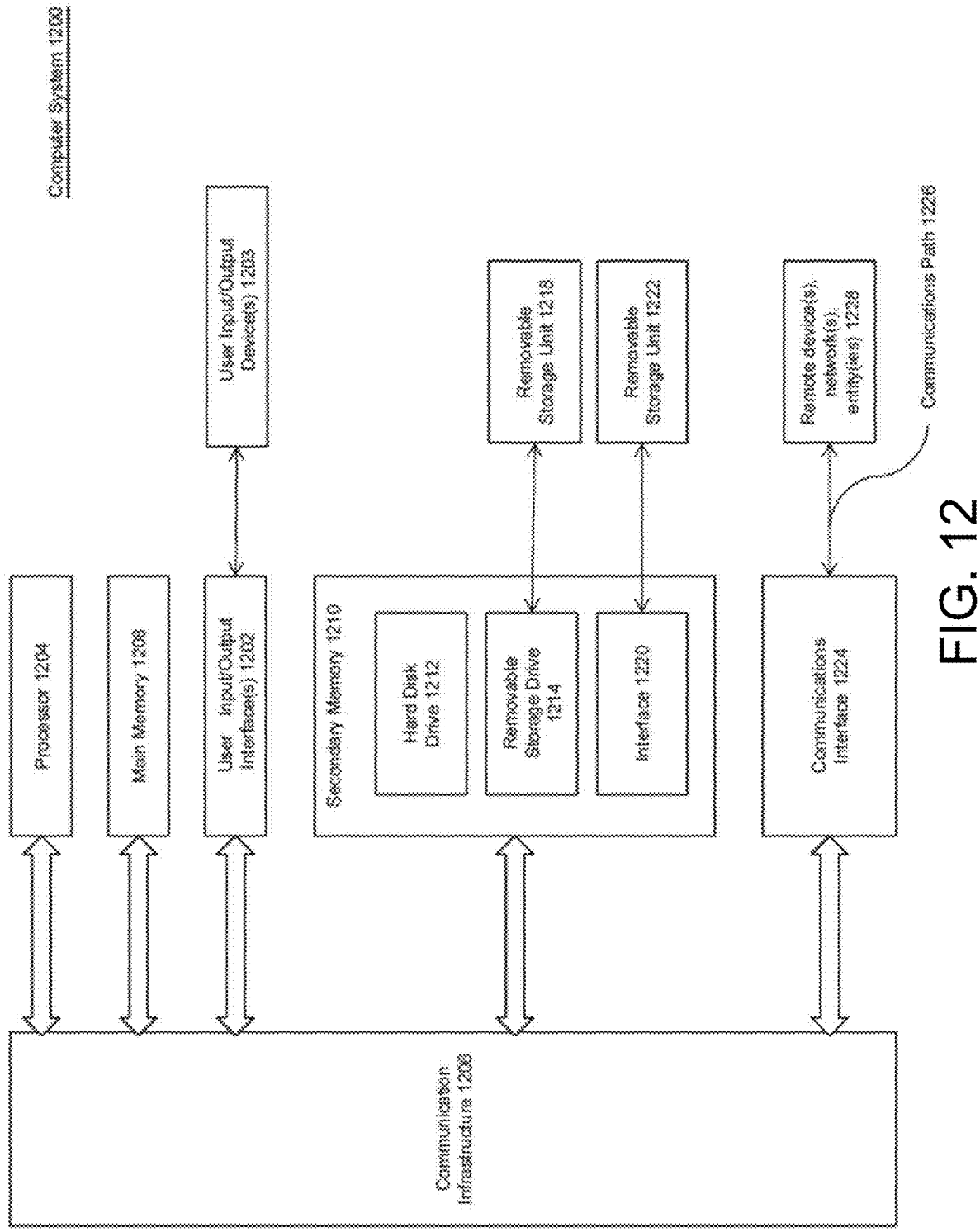
FIG. 12 is a block diagram of example components of a device according to an embodiment.

FIG. 12 is a block diagram of example components of computer system 1200. One or more computer systems 1200 may be used, for example, to implement any of the embodiments discussed herein, as well as combinations and sub-combinations thereof. Computer system 1200 may include one or more processors (also called central processing units, or CPUs), such as a processor 1204. Processor 1204 may be connected to a communication infrastructure or bus 1206.

Computer system 1200 may also include user input/output interface(s) 1202, such as monitors, keyboards, pointing devices, etc., which may communicate with communication infrastructure 1206 through user input/output device(s) 1203

One or more of processors 1204 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 may also include a main or primary memory 1208, such as random access memory (RAM). Main memory 1208 may include one or more levels of cache. Main memory 1208 may have stored therein control logic (i.e., computer software) and/or data.

Computer system 1200 may also include one or more secondary storage devices or memory 1210. Secondary memory 1210 may include, for example, a hard disk drive 1212 and/or a removable storage drive 1214.

Removable storage drive 1214 may interact with a removable storage unit 1218. Removable storage unit 1218 may include a computer usable or readable storage device having stored thereon computer software (control logic) and/or data. Removable storage unit 1218 may be a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 1214 may read from and/or write to removable storage unit 1218.

Secondary memory 1210 may include other means, devices, components, instrumentalities, or other approaches for allowing computer programs and/or other instructions and/or data to be accessed by computer system 1200. Such means, devices, components, instrumentalities, or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 may enable computer system 1200 to communicate and interact with any combination of external devices, external networks, external entities, etc. (individually and collectively referenced by reference number 1228). For example, communication interface 1224 may allow computer system 1200 to communicate with external or remote devices 1228 over communications path 1226, which may be wired and/or wireless (or a combination thereof), and which may include any combination of LANs, WANs, the Internet, etc. Control logic and/or data may be transmitted to and from computer system 1200 via communication path 1226.

Computer system 1200 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 1200 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), may cause such data processing devices to operate as described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

REFERENCES

Abatemarco D, Perera S, Bao S H, Desai S, Assuncao B, Tetarenko N, Danysz K, Mockute R, Widdowson M, Fornarotto N, Beauchamp S, Cicirello S, Mingle E. Training Augmented Intelligent Capabilities for Pharmacovigilance: Applying Deep-learning Approaches to Individual Case Safety Report Processing. Pharmaceut Med. 2018; 32(6):391-401.

Danysz K, Cicirello S, Mingle E, Assuncao B, Tetarenko N, Mockute R, Abatemarco D, Widdowson M, Desai S. Artificial Intelligence and the Future of the Drug Safety Professional. Drug Saf 2019 April; 42(4):491-497.

Devlin J, Chang M-W, Lee K, Toutanova K. Bert: pretraining of deep bidirectional transformers for language understanding. In: Proceedings of the 2019 Conference of the North American Chapter of the Association for Computational Linguistics: Human Language Technologies, Volume 1 (Long and Short Papers), Minneapolis, MN, USA. pp. 4171-4186. Association for Computational Linguistics. https://www.aclweb.org/anthology/N19-1423.

FDA Adverse Event Reporting System (FAERS) Public Dashboard. US Food and Drug Administration website. Updated Jun. 30, 2020. Accessed Oct. 22, 2020. https://fis.fda.gov/sense/app/d10be6bb-494e-4cd2-82e4-0135608ddc13/sheet/7a47a261-d58b-4203-a8aa-6d3021737452/state/analysis.

Lee J, Yoon W, Kim S, Kim D, Kim S, So C H, Kang J. BioBERT: a pre-trained biomedical language representation model for biomedical text mining. Bioinformatics. 2020 Feb. 15; 36(4):1234-1240.

Lewis D J, McCallum J F. Utilizing Advanced Technologies to Augment Pharmacovigilance Systems: Challenges and Opportunities. Ther Innov Regul Sci. 2020 July; 54(4): 888-899. McMaster C, Liew D, Keith C, Aminian P, Frauman A. A Machine-Learning Algorithm to Optimise Automated Adverse Drug Reaction Detection from Clinical Coding. Drug Saf 2019 June; 42(6):721-725.

Mockute R, Desai S, Perera S, Assuncao B, Danysz K, Tetarenko N, Gaddam D, Abatemarco D, Widdowson M, Beauchamp S, Cicirello S, Mingle E. Artificial Intelligence Within Pharmacovigilance: A Means to Identify Cognitive Services and the Framework for Their Validation. Pharmaceut Med. 2019 April; 33(2):109-120.

Pharmacovigilance. World Health Organization website. Updated 2020. Accessed Nov. 6, 2020. https://www.who.int/teams/regulation-prequalification/pharmacovigilance.

Schmider J, Kumar K, LaForest C, Swankoski B, Naim K, Caubel P M. Innovation in Pharmacovigilance: Use of Artificial Intelligence in Adverse Event Case Processing. Clin Pharmacol Ther. 2019 April; 105(4):954-961.

Stergiopoulos S, Fehrle M, Caubel P, Tan L, Jebson L. Adverse Drug Reaction Case Safety Practices in Large Biopharmaceutical Organizations from 2007 to 2017: An Industry Survey. Pharmaceut Med. 2019 December; 33(6):499-510.

What is claimed is:

1. A method comprising:
  receiving, by one or more computing devices, a set of documents and metadata for each document in the set of documents, wherein the set of documents correspond to a domain;
  generating, by the one or more computing devices, a set of word embeddings for each document of the set of documents, each word embedding including one or more words from a respective document;
  tokenizing, by the one or more computing devices, each word embedding of the set of word embeddings into a set of segments, each segment including a word from the word embedding;
  training, by the one or more computing devices, a learning model to classify each document of the set of documents of the domain by recursively, during each of a number of iterations of the training:
    breaking down, by the one or more computing devices, each of the segments of the set of segments of each document of the set of documents into a set of features;
    assigning, by the one or more computing devices, a part-of-speech tag to each of the segments of the set of segments for each document of the set of documents based on predetermined weights assigned to each feature of the set of features of a corresponding segment;
    assigning, by the one or more computing devices, a dependency tag to each of the segments of the set of segments of each document of the set of documents based on the part-of-speech tag assigned to the corresponding segment and the predetermined weights assigned to each feature of the set of features of the corresponding segment;

assigning, by the one or more computing devices, a Named Entity Recognition (NER) label from a set of predefined labels corresponding to the domain to each of the segments of the set of segments of each document of the set of documents based on the part-of-speech tag and the dependency tag assigned to the corresponding segment and the predetermined weights assigned to each feature of the set of features of the corresponding segment; and validating, by the one or more computing devices, the assigned NER labels by comparing the metadata for each document to the assigned NER labels of the respective document.

2. The method of claim 1, further comprising:

receiving, by the one or more computing devices, a request to classify a new document corresponding to the domain;

generating, by the one or more computing devices, a new word embedding including one or more words of the new document;

tokenizing, by the one or more computing devices, the new word embedding corresponding to the domain into a new set of segments;

breaking down, by the one or more computing devices, each new segment of the new set of the segments of the new document into a new set of features;

assigning, by the one or more computing devices, a new part-of-speech tag to each new segment of the new set of segments of the new document based on predetermined weights assigned to each feature of the new set of features of a corresponding new segment, using the trained learning model;

assigning, by the one or more computing devices, a new dependency label to each of the new segments of the new set of segments of the new document based on the part-of-speech tag assigned to the corresponding new segment and the predetermined weights assigned to each feature of the new set of features of the corresponding new segment, using the trained learning model;

assigning, by the one or more computing devices, a new NER label from the set of predefined labels corresponding to the domain to each of the segments of the new set of segments of the new document based on the part-of-speech tag and the dependency tag assigned to the new corresponding segment and the predetermined weights assigned to each feature of the new set of features of the corresponding new segment, using the trained learning model; and classifying, by the one or more computing devices, the new document corresponding to the domain based on the assigned NER labels, using the trained learning model.

3. The method of claim 2, further comprising:

extracting, by the one or more computing devices, the new set of segments and the assigned NER labels; and generating, by the one or more computing devices, a knowledge base, wherein:

the knowledge base comprises a plurality of nodes and a plurality of edges, an edge connects each node of the plurality of nodes to at least one other node of the plurality of nodes based on a relationship, and each node of the plurality of nodes comprises at least one segment of the new set of segments and a corresponding NER label of the assigned NER labels.

4. The method of claim 3, further comprising identifying, by the one or more computing devices, the relationship between a node of the plurality of nodes and a different node of the plurality of nodes based on a first NER label of the assigned NER labels in the node and a second NER label of the assigned NER labels stored in the different node.

5. The method of claim 1, further comprising, based on validating the assigned NER labels, modifying, by the one or more computing devices, the predetermined weights assigned to each feature of the set of features of the corresponding segment for use during a subsequent iteration of the number of iterations of the training.

6. The method of claim 1, wherein the learning model uses a statistical model to assign the part-of-speech tag to each of the one or more strings for each document of the set of documents, the dependency label to each of the segments of the set of segments for each document of the set of documents, and the NER label from the set of predefined labels corresponding to the domain to each of the segments of the set of segments for each document of the set of documents.

7. The method of claim 1, wherein the trained learning model implements a supervised learning algorithm.

8. The method of claim 1, further comprising:

generating, by the one or more computing devices, a feature map for each document of the set of documents based on the set of features for each corresponding segment of each corresponding document;

generating, by the one or more computing devices, a reduced feature map for each document of the set of documents by reducing a dimensionality characteristic of the feature map for each corresponding segment of each corresponding document;

transforming, by the one or more computing devices, the reduced feature map for each corresponding segment of each corresponding document into a vector; and applying, by the one or more computing devices, the predetermined weights assigned to each feature of the set of features to each corresponding vector.

9. A system comprising:

a memory;

a processor coupled to a memory, wherein the processor is configured to:

receive a set of documents and metadata for each document in the set of documents, wherein the set of documents correspond to a domain;

generate a set of word embeddings for each document of the set of documents, each word embedding including one or more words from a respective document;

tokenize each word embedding of the set of word embeddings into a set of segments, each segment including a word from the word embedding;

train a learning model to classify each document of the set of documents of the domain by recursively, during each of a number of iterations of the training:

breaking down the segments of the set of segments of each document of the set of documents into a set of features;

assigning a part-of-speech tag to each of the segments of the set of segments for each document of the set of documents based on predetermined weights assigned to each feature of the set of features of a corresponding segment;

assigning a dependency tag to each of the segments of the set of segments of each document of the set of documents based on the part-of-speech tag assigned to the corresponding segment and the predetermined weights assigned to each feature of the set of features of the corresponding segment;

assigning a Named Entity Recognition (NER) label from a set of predefined labels corresponding to the domain to each of the segments of the set of segments of each document of the set of documents based on the part-of-speech tag and the dependency tag assigned to the corresponding segment and the predetermined weights assigned to each feature of the set of features of the corresponding segment; and validating the assigned NER labels by comparing the metadata for each document to the assigned NER labels of the respective document.

10. The system of claim 9, wherein the processor further configured to:

receive a request to classify a new document corresponding to the domain; generate a new word embedding including one or more words of the new document;

tokenize the new word embedding corresponding to the domain into a new set of segments;

breakdown each new segment of the new set of segments of the new document into a new set of features;

assign a new part-of-speech tag to each new segment of the new set of segments of the new document based on predetermined weights assigned to each feature of the new set of features of a corresponding new segment, using the trained learning model;

assign a new dependency label to each of the new segments of the new set of segments of the new document based on the part-of-speech tag assigned to the corresponding new segment and the predetermined weights assigned to each feature of the new set of features of the corresponding new segment, using the trained learning model;

assign a new NER label from the set of predefined labels corresponding to the domain to each of the segments of the new set of segments of the new document based on the part-of-speech tag and the dependency tag assigned to the new corresponding segment and the predetermined weights assigned to each feature of the new set of features of the corresponding new segment, using the trained learning model; and classify the new document corresponding to the domain based on the assigned NER labels, using the trained learning model.

11. The system of claim 10, wherein the processor is further configured to:

extract the new set of segments and the assigned NER labels; and generate a knowledge base, wherein:
the knowledge base comprises a plurality of nodes and a plurality of edges,
an edge connects each node of the plurality of nodes to at least one other node of the plurality of nodes based on a relationship, and
each node of the plurality of nodes comprises at least one segment of the new set of segments and a corresponding NER label of the assigned NER labels.

12. The system of claim 11, wherein the processor is further configured to identify the relationship between a node of the plurality of nodes and a different node of the plurality of nodes based on a first NER label of the assigned NER labels in the node and a second NER label of the assigned NER labels stored in the different node.

13. The system of claim 9, wherein the processor further configured to, based on validating the assigned NER labels, modify the predetermined weights assigned to each feature of the set of features of the corresponding segment for use during a subsequent iteration of the number of iterations of the training.

14. The system of claim 9, wherein the learning model uses a statistical model to assign the part-of-speech tag to each of the one or more strings for each document of the set of documents, the dependency label to each of the segments of the set of segments for each document of the set of documents, and the NER label from the set of predefined labels corresponding to the domain to each of the segments of the set of segments for each document of the set of documents.

15. The system of claim 9, wherein the trained learning model implements a supervised learning algorithm.

16. The system of claim 9, wherein the processor further configured to:

generate a feature map for each document of the set of documents based on the set of features for each corresponding segment of each corresponding document;

generate a reduced feature map for each document of the set of documents by reducing a dimensionality characteristic of the feature map for each corresponding segment of each corresponding document;

transform the reduced feature map for each corresponding segment of each corresponding document into a vector; and apply the predetermined weights assigned to each feature of the set of features to each corresponding vector.

* * * * *